US010660036B2

(12) United States Patent
Lee et al.

(10) Patent No.: US 10,660,036 B2
(45) Date of Patent: May 19, 2020

(54) APPARATUS AND METHOD FOR PERFORMING PAGING PROCESS IN WIRELESS COMMUNICATION SYSTEM

(71) Applicant: Samsung Electronics Co., Ltd., Suwon-si, Gyeonggi-do (KR)

(72) Inventors: Sung-Jin Lee, Bucheon-si (KR); Jung-Soo Jung, Seongnam-si (KR); Ra-Yeon Ahn, Seoul (KR); Ji-Won Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 184 days.

(21) Appl. No.: 15/153,242

(22) Filed: May 12, 2016

(65) Prior Publication Data
US 2016/0338006 A1    Nov. 17, 2016

Related U.S. Application Data

(60) Provisional application No. 62/162,235, filed on May 15, 2015, provisional application No. 62/232,877, filed on Sep. 25, 2015.

(30) Foreign Application Priority Data

Dec. 28, 2015  (KR) .......................... 10-2015-0187181

(51) Int. Cl.
*H04W 68/02* (2009.01)
*H04W 52/02* (2009.01)

(52) U.S. Cl.
CPC ..... *H04W 52/0229* (2013.01); *H04W 68/025* (2013.01); *Y02D 70/00* (2018.01);
(Continued)

(58) Field of Classification Search
CPC .................. H04W 52/0229; H04W 68/025
See application file for complete search history.

(56) References Cited

U.S. PATENT DOCUMENTS 7,711,377 B2  5/2010  Laroia et al.
8,229,477 B1  7/2012  Vargantwar et al.
(Continued)

FOREIGN PATENT DOCUMENTS

CN    101843153 A    9/2010
CN    101945338 A    1/2011
(Continued)

OTHER PUBLICATIONS

3GPP; 3rd Generation Partnership Project; Technical Specification Group GSM/EDGE Radio Access Network; Cellular System Support for Ultra Low Complexity and Low Throughput Internet of Things; (Release 13); Draft 3GPP TR 45.820; V1.4.0; Global System for Mobile Communications; Aug. 27, 2015.
(Continued)

*Primary Examiner* — Christopher M Brandt
(74) *Attorney, Agent, or Firm* — Jefferson IP Law, LLP

(57) ABSTRACT

The present disclosure relates to a pre-5th-generation (5G) or 5G communication system to be provided for supporting higher data rates beyond 4th-generation (4G) communication system such as a long term evolution (LTE). A method for performing a paging process by a base station (BS) in a wireless communication system is provided. The method includes identifying that paging for a mobile station (MS) is initiated, and transmitting a paging indicator including a first part indicating a paging identifier (ID) and a second part indicating a group in which at least one MS which needs to receive a paging message is included.

20 Claims, 23 Drawing Sheets

(52) U.S. Cl.
CPC ...... *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/164* (2018.01); *Y02D 70/166* (2018.01); *Y02D 70/168* (2018.01); *Y02D 70/21* (2018.01); *Y02D 70/24* (2018.01); *Y02D 70/26* (2018.01)

(56) References Cited

U.S. PATENT DOCUMENTS

| | | | |
|---|---|---|---|
| 8,626,204 | B1 | 1/2014 | Oroskar et al. |
| 8,768,385 | B2 * | 7/2014 | Chandramouli ...... H04W 68/00 370/312 |
| 2009/0181701 | A1 * | 7/2009 | Willey ............... H04W 68/025 455/458 |
| 2010/0062772 | A1 | 3/2010 | Peng et al. |
| 2010/0248750 | A1 * | 9/2010 | Muller ................. H04W 68/02 455/458 |
| 2010/0329201 | A1 | 12/2010 | Kang et al. |
| 2013/0012244 | A1 * | 1/2013 | Lee .................... H04W 52/346 455/458 |
| 2013/0208694 | A1 | 8/2013 | Park et al. |
| 2014/0003234 | A1 * | 1/2014 | Chou .................. H04W 4/005 370/230 |
| 2014/0079036 | A1 | 3/2014 | Montojo et al. |
| 2014/0181200 | A1 * | 6/2014 | Huang .................. H04L 51/38 709/204 |
| 2016/0338032 | A1 * | 11/2016 | Wang ............... H04W 72/0406 |

FOREIGN PATENT DOCUMENTS

| | | |
|---|---|---|
| CN | 102158959 A | 8/2011 |
| CN | 102316580 A | 1/2012 |
| CN | 102474847 A | 5/2012 |
| CN | 103999524 A | 8/2014 |
| WO | 2012/053857 A2 | 4/2012 |

OTHER PUBLICATIONS

Siemens; Proposal for PCH Modifications in TDD; TSG-RAN Working Group 1 meeting #6; TSGR1#5(99)863; Jul. 13-16, 1999; Espoo, Finland.

Motorola; E-UTRA DL L1/L2 Control Channel Design—PICH/AICH; 3GPP TSG RAN1 #49; R1-072173; May 7-11, 2007; Kobe, Japan.

Ipwireless et al.; Paging group indication; 3GPP TSG RAN WG2 #59; R2-073187; Jun. 20-24, 2007; Athens, Greece.

Chinese Office Action dated Mar. 24, 2020, issued in a counterpart Chinese Application No. 201680027897.4.

3GPP TSG GERAN #64, San Francisco, USA, GP-140854, Huawei Technologies Co., Ltd, NB M2M—Paging for Cellular IoT, Nov. 21, 2014.

* cited by examiner

APPARATUS AND METHOD FOR PERFORMING PAGING PROCESS IN WIRELESS COMMUNICATION SYSTEM

CROSS-REFERENCE TO RELATED APPLICATION(S)

This application claims the benefit under 35 U.S.C. § 119(e) of a U.S. Provisional application filed on May 15, 2015 in the U.S. Patent and Trademark Office and assigned Ser. No. 62/162,235, of a U.S. Provisional application filed on Sep. 25, 2015 in the U.S. Patent and Trademark Office and assigned Ser. No. 62/232,877, and under 35 U.S.C. § 119(a) of a Korean patent application filed on Dec. 28, 2015 in the Korean Intellectual Property Office and assigned Serial No. 10-2015-0187181, the entire disclosure of all each of which is hereby incorporated by reference.

TECHNICAL FIELD

The present disclosure relates to an apparatus and method for performing a paging process in a wireless communication system.

BACKGROUND

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-points (CoMP), reception-end interference cancellation, and the like.

In the 5G system, a hybrid frequency shift keying (FSK) and quadrature amplitude modulation (QAM) modulation (FQAM) and a sliding window superposition coding (SWSC) as an advanced coding modulation (ACM) scheme, and a filter bank multi carrier (FBMC) scheme, a non-orthogonal multiple access (NOMA) scheme, and a sparse code multiple access (SCMA) scheme as an advanced access technology have been developed.

A paging process which is performed in a general wireless communication system will be described below.

Firstly, an example of a paging process which is performed in a general wireless communication system will be described with reference to FIG. 1.

FIG. 1 schematically illustrates an example of a paging process which is performed in a general wireless communication system according to the related art.

Referring to FIG. 1, a paging process in FIG. 1 is a paging process which is supported in a 3rd generation partnership project (3GPP) LTE mobile communication system, and supports a paging operation for a mobile station (MS) using two channels, i.e., a scheduling channel and a data channel. The term MS will be interchangeable with the term user equipment (UE), device, subscriber station, and the like.

A base station (BS) transmits the first paging signal through a scheduling channel. The first paging signal is a signal indicating whether there is paging, and the BS transmits the first paging signal thereby all MSs within a cell managed by the BS may receive the first paging signal. The term BS will be interchangeable with the term node B, evolved node B (eNB), evolved universal terrestrial radio access network (E-UTRAN) node B, access point (AP), and the like.

MSs which do not receive the first paging signal or do not normally receive the first paging signal through the scheduling channel among the MSs transit to a sleep mode.

The BS transmits the second paging signal through a data channel, and the second paging signal includes a paging message. The paging message includes an MS identifier (ID) for an MS which is paged, i.e., a target MS. So, the target MS identifies that there is paging for the target MS.

In a paging process which is performed in a general wireless communication system as described in FIG. 1, all MSs need to decode the first and second paging signals for paging which targets a specific MS. So, power consumption of an MS is increased due to the decoding for the first and second paging signals.

An example of a paging process which is performed in a general wireless communication system has been described with reference to FIG. 1, and another example of a paging process which is performed in a general wireless communication system will be described with reference to FIG. 2.

FIG. 2 schematically illustrates another example of a paging process which is performed in a general wireless communication system according to the related art.

Referring to FIG. 2, a paging process in FIG. 2 is a paging process proposed for supplementing a paging process in FIG. 1, and enables only MSs which need to receive the second paging signal to receive the second paging signal, not all MSs by including information on the MSs which need to receive the second paging signal, i.e., a paging group into the first paging signal.

A paging process performed in a general communication system as described in FIG. 2 may be enhanced compared to a paging process as described in FIG. 1 for power consumption of an MS. However, the paging process as described in FIG. 2 needs to allocate a paging group ID for each of paging groups, so resource efficiency is decreased due to allocation of a paging group ID. The paging groups are generated for all MSs, so a paging group which will receive the second paging signal needs to include a plurality of MSs.

So, in a paging process performed in a general communication system as described in FIG. 2, many MSs need to decode the first and second paging signals for paging which targets a specific MS as ever. So, power consumption of an MS is increased due to the decoding for the first and second paging signals.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for performing a paging process in a wireless communication system.

Another aspect of the present disclosure is to provide an apparatus and method for performing a paging process thereby decreasing power consumption of a mobile station (MS) in a wireless communication system.

Another aspect of the present disclosure is to provide an apparatus and method for performing a paging process by considering a coverage class in a wireless communication system.

Another aspect of the present disclosure is to provide an apparatus and method for performing a paging process by considering an idle mode operation in a wireless communication system.

Another aspect of the present disclosure is to provide an apparatus and method for performing a paging process thereby decreasing resource consumption for the paging process in a wireless communication system.

Another aspect of the present disclosure is to provide an apparatus and method for performing a paging process thereby increasing resource efficiency in a wireless communication system.

In accordance with an aspect of the present disclosure, a method for performing a paging process by a base station (BS) in a wireless communication system is provided. The method includes identifying that paging for an MS is initiated, and transmitting a paging indicator including a first part indicating a paging identifier (ID) and a second part indicating a group in which at least one MS which needs to receive a paging message is included.

In accordance with another aspect of the present disclosure, a method for performing a paging process by an MS in a wireless communication system is provided. The method includes identifying a need for monitoring whether there is a need for receiving a paging message, and receiving a paging indicator including a first part indicating a paging ID and a second part indicating a group in which at least one MS which needs to receive a paging message is included from a BS.

In accordance with another aspect of the present disclosure, a BS in a wireless communication system is provided. The BS includes a processor configured to identify that paging for an MS is initiated, and transmit a paging indicator including a first part indicating a paging ID and a second part indicating a group in which at least one MS which needs to receive a paging message is included.

In accordance with another aspect of the present disclosure, an MS in a wireless communication system is provided. The MS includes a processor configured to identify a need for monitoring whether there is a need for receiving a paging message, and receive a paging indicator including a first part indicating a paging ID and a second part indicating a group in which at least one MS which needs to receive a paging message is included from a BS.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
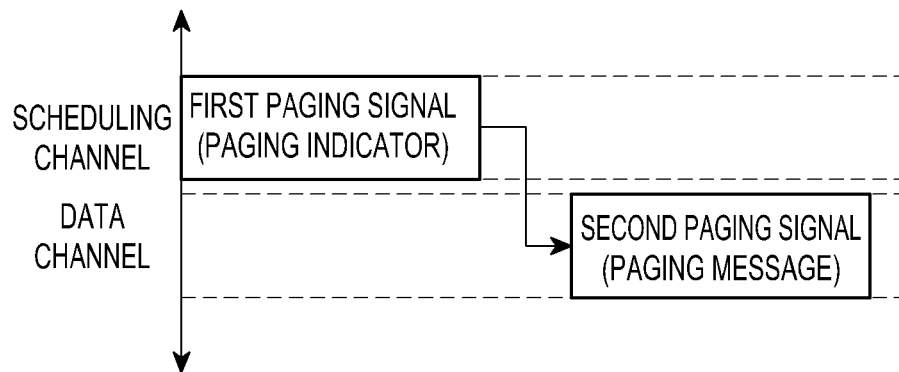
FIG. 1 schematically illustrates an example of a paging process which is performed in a general wireless communication system according to the related art.
Figure 2:
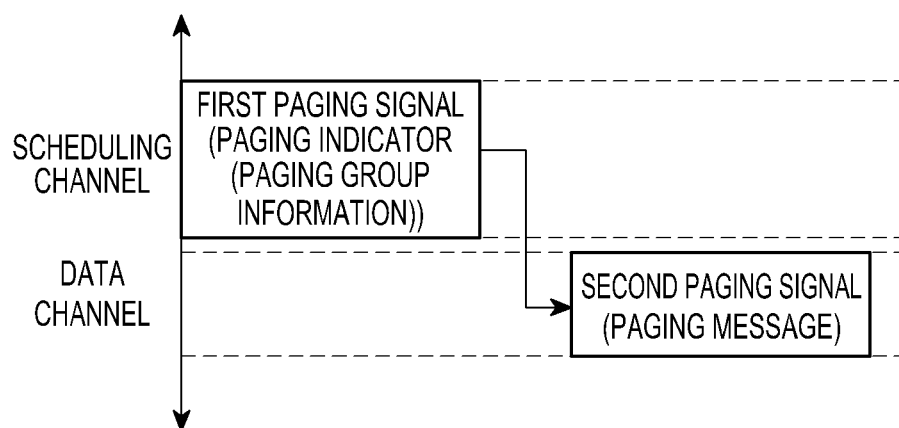
FIG. 2 schematically illustrates another example of a paging process which is performed in a general wireless communication system according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device may include communication functionality. For example, an electronic device may be a smart phone, a tablet personal computer (PC), a mobile phone, a video phone, an e-book reader, a desktop PC, a laptop PC, a netbook PC, a personal digital assistant (PDA), a portable multimedia player (PMP), a Moving Picture Experts Group phase 1 or phase 2 (MPEG-1 or MPEG-2) audio layer 3 (mp3) player, a mobile medical device, a camera, a wearable device (e.g., a head-mounted device (HMD), electronic clothes, electronic braces, an electronic necklace, an electronic appcessory, an electronic tattoo, or a smart watch), and/or the like.

According to various embodiments of the present disclosure, an electronic device may be a smart home appliance with communication functionality. A smart home appliance may be, for example, a television (TV), a digital versatile disc (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device may be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device may be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device may be any combination of the foregoing devices. In addition, it will be apparent to one having ordinary skill in the art that an electronic device according to various embodiments of the present disclosure is not limited to the foregoing devices.

According to various embodiments of the present disclosure, a signal receiving apparatus may be a mobile station (MS) or a base station (BS), and a signal transmitting apparatus may be an MS or a BS. The term MS may be interchangeable with the term user equipment (UE), device, subscriber station, and the like. The term BS may be interchangeable with the term node B, evolved node B (eNB), evolved universal terrestrial radio access network (E-UTRAN) node B, and the like.

An embodiment of the present disclosure proposes an apparatus and method for performing a paging process in a wireless communication system.

An embodiment of the present disclosure proposes an apparatus and method for performing a paging process thereby decreasing power consumption of an MS in a wireless communication system.

An embodiment of the present disclosure proposes an apparatus and method for performing a paging process by considering a coverage class in a wireless communication system.

An embodiment of the present disclosure proposes an apparatus and method for performing a paging process by considering an idle mode operation in a wireless communication system.

An embodiment of the present disclosure proposes an apparatus and method for performing a paging process thereby decreasing resource consumption for the paging process in a wireless communication system.

An embodiment of the present disclosure proposes an apparatus and method for performing a paging process thereby increasing resource efficiency in a wireless communication system.

An apparatus and method proposed in various embodiments of the present disclosure may be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSUPA) mobile communication system, a high rate packet data (HRPD) mobile communication system proposed in a $3^{rd}$ generation partnership project 2 (3GPP2), a wideband code division multiple access (WCDMA) mobile communication system proposed in the 3GPP2, a CDMA mobile communication system proposed in the 3GPP2, an institute of electrical and electronics engineers (IEEE) 802.16m communication system, an IEEE 802.16e communication system, an evolved packet system (EPS), and a mobile internet protocol (mobile IP) system, a digital video broadcast system such as a mobile broadcast service such as a digital multimedia broadcasting (DMB) service, a digital video broadcasting-handheld (DVP-H), an advanced TV systems committee-mobile/handheld (ATSC-M/H) service, and the like, and an IPTV, an MPEG media transport (MMT) system and/or the like.

An embodiment of the present disclosure considers an idle mode operation of long distance-internet of things (IoT) MS among low throughput discussed in 3GPP and wireless network technology standards. Such technologies define an energy effective operation for each MS to operate for a long time, e.g., for 10 years without battery replacement. So, such technologies define a coverage class stage based on a quantized value of a path-loss value from a BS to an MS for the energy effective operation, and consider to facilitate a simple resource operation using a resource allocation scheme which is based on the coverage class stage. Here, a coverage class may be one of a coverage level, a coverage enhancement level, and the like.

An embodiment of the present disclosure considers an effective idle mode operation which is based on a coverage class. An embodiment of the present disclosure proposes an apparatus and method for performing a paging process thereby decreasing power consumption of MS s and increasing resource efficiency in a case that the number of the MS s is greater than or equal to a preset threshold value.

A paging process proposed in a wireless communication system according to an embodiment of the present disclosure may be one of the following 9 options, i.e., options 1 to 9, and 9 options will be described below.

(1) Option 1

A BS transmits a paging indicator through a synchronization channel, e.g., a primary synchronization signal (PSS), a secondary synchronization signal (SSS), and the like, and transmits a paging message through a control channel, e.g., a physical downlink control channel (PDCCH), and the like. The paging indicator may include a paging identification (ID) or information related to a paging ID. The paging message includes an ID of at least one MS which is paged. The paging indicator may be implemented with various forms, and a description thereof will be followed and omitted herein.

(2) Option 2

A BS transmits a paging indicator through a synchronization channel such as a PSS, an SSS, and the like, and transmits a paging message through a shared channel, e.g., a physical downlink shared channel (PDSCH).

(3) Option 3

A BS transmits a paging indicator through a master information block (MIB), and transmits a paging message through a control channel, e.g., a PDCCH.

(4) Option 4

A BS transmits a paging indicator through an MIB, and transmits a paging message through a shared channel, e.g., a PDSCH.

(5) Option 5

A BS transmits a paging indicator through a system information block (SIB), and transmits a paging message through a control channel, e.g., a PDCCH.

(6) Option 6

A BS transmits a paging indicator through an SIB, and transmits a paging message through a shared channel, e.g., a PDSCH.

(7) Option 7

A BS transmits a paging indicator through a new channel, e.g., a new physical channel, and transmits a paging message through a control channel, e.g., a PDCCH.

(8) Option 8

A BS transmits a paging indicator through a new channel, e.g., a new physical channel, and transmits a paging message through a shared channel, e.g., a PDSCH.

(9) Option 9

A BS transmits a paging indicator through a control channel, e.g., a PDCCH, and transmits a paging message through a shared channel, e.g., a PDSCH.

The options 1 to 9 may be summarized as the following Table 1.

TABLE 1

| | Synchronization channel | MIB | SIB | New CH | PDCCH | PDSCH |
|---|---|---|---|---|---|---|
| Opt 1 | MSG 1 | | | | MSG 2 | |
| Opt 2 | MSG 1 | | | | | MSG 2 |
| Opt 3 | | MSG 1 | | | MSG 2 | |
| Opt 4 | | MSG 1 | | | | MSG 2 |
| Opt 5 | | | MSG 1 | | MSG 2 | |
| Opt 6 | | | MSG 1 | | | MSG 2 |

TABLE 1-continued

| Synchronization channel | MIB | SIB | New CH | PDCCH | PDSCH |
|---|---|---|---|---|---|
| Opt 7 | | | MSG 1 | MSG 2 | |
| Opt 8 | | | MSG 1 | | MSG 2 |
| Opt 9 | | | | MSG 1 | MSG 2 |

In Table 1, "MSG 1" denotes a paging indicator, and "MSG 2" denotes a paging message or an MS ID (or MS ID list) which is paged. An MS ID list includes at least one MS ID.

An operation of a BS and an operation of an MS according to each of the options 1 to 9 will be described below.

(1) Option 1

A paging indicator may be implemented with one of the following two forms, and this will be described below.

Firstly, the paging indicator may be implemented thereby informing only whether there is paging. That is, an MS may know only whether there is paging upon receiving the paging indicator. For convenience, a paging indicator which is implemented for informing only whether there is paging will be referred to as "individual paging indicator."

For example, the individual paging indicator is implemented with one bit. If a value of the individual paging indicator is set to a preset value, e.g., '1', it means that there is paging. If a value of the individual paging indicator is set to a preset value, e.g., '0', it means that there is no paging.

Secondly, the paging indicator may be implemented thereby informing whether there is paging on a paging group basis. That is, an MS may know that there is paging for which paging group among paging groups supported in a wireless communication system upon receiving the paging indicator. For convenience, a paging indicator which is implemented for informing whether there is paging for which paging group among paging groups supported in a wireless communication system will be referred to as "group paging indicator." The group paging indicator may be implemented with various forms, and a scheme for implementing the group paging indicator will be described below, so a description thereof will be omitted herein.

A paging group includes at least one MS, and may be generated with various forms. This will be described below.

Firstly, a paging group may be generated based on an MS ID, and this will be described below.

A paging group is determined based on an MS ID such as a system architecture evolution (SAE)-temporary mobile subscriber identity (TMSI) (S-TMSI) which is allocated to an MS when the MS is attached, an international mobile subscriber identity (IMSI) as a unique ID of an MS, and/or the like, and generated corresponding to one of the following schemes. The paging group may be generated corresponding to schemes other than the following schemes, and a description thereof will be omitted herein.

A paging group is generated based on least significant bit (LSB) n bits or most significant bit (MSB) n bits of an MS ID. Here, n is an integer which is greater than or equal to 1.

Alternatively, a paging group is generated based on a modulo m operation for an MS ID. Here, m is an integer which is greater than or equal to 1.

Secondly, a process for generating a paging group based on an application or a service which is performed in an MS will be described below.

A paging group may be generated based on an application or a service which is performed in an MS, and is generated corresponding to one of the following schemes. The paging group may be generated corresponding to schemes other than the following schemes, and a description thereof will be omitted herein.

A paging group is generated based on LSB n bits or MSB n bits of a service ID of a service which is performed in an MS or an application ID of an application which is performed in an MS.

Alternatively, a paging group is generated based on a modulo m operation for a service ID of a service which is performed in an MS or an application ID of an application which is performed in an MS.

Thirdly, a process for generating a paging group based on a location of an MS will be described below.

A paging group may be generated based on a location of an MS, and is generated corresponding to one of the following schemes. The paging group may be generated corresponding to schemes other than the following schemes, and a description thereof will be omitted herein.

A paging group is generated based on LSB n bits or MSB n bits of a GPS value for an MS.

Alternatively, a paging group is generated based on a modulo m operation for a GPS value for an MS.

Fourthly, a process for generating a paging group based on a device-related ID of an MS will be described below.

A paging group may be generated based on a device-related ID, e.g., a sensor ID, a medium access control (MAC) address, an IP address, a product key, and the like of a corresponding MS, and is generated corresponding to one of the following schemes. The paging group may be generated corresponding to schemes other than the following schemes, and a description thereof will be omitted herein.

A paging group is generated based on LSB n bits or MSB n bits of a device-related ID.

Alternatively, a paging group is generated based on a modulo m operation for a device-related ID.

The group paging indicator will be described below.

The group paging indicator may be classified into a one-part group paging indicator which is implemented with one part and a two-part group paging indicator which is implemented with two parts, and the one-part group paging indicator will be described below.

Firstly, the one-part group paging indicator may be implemented based on a bitmap. For example, if the one-part group paging indicator is implemented with four bits and is "0100," it means that a paging group in which MSs of which LSB 2 bits of an S-TMSI are "01" are included as the second group among MSs of which LSB 2 bits of an S-TMSI are 00, 01, 10, 11 is a paged group.

Secondly, the one-part group paging indicator may be implemented based on a bit sequence. For example, if the one-part group paging indicator is implemented with four bits and is "0100," it means that a paging group in which MSs of which LSB 4 bits of an S-TMSI are "0100" are included is a paged group. For another example, if the one-part group paging indicator is implemented with four bits and is "0100," it indicates that a paging group in which corresponding MSs are included is a paged group by mapping a hash function for a GPS value of an MS to "0100."

The two-part group paging indicator will be described in a description of the option 9, so a description thereof will be omitted herein.

An example of a process for performing a paging process in an MS in a wireless communication system according to an embodiment of the present disclosure will be described with reference to FIG. 3.

Figure 3:
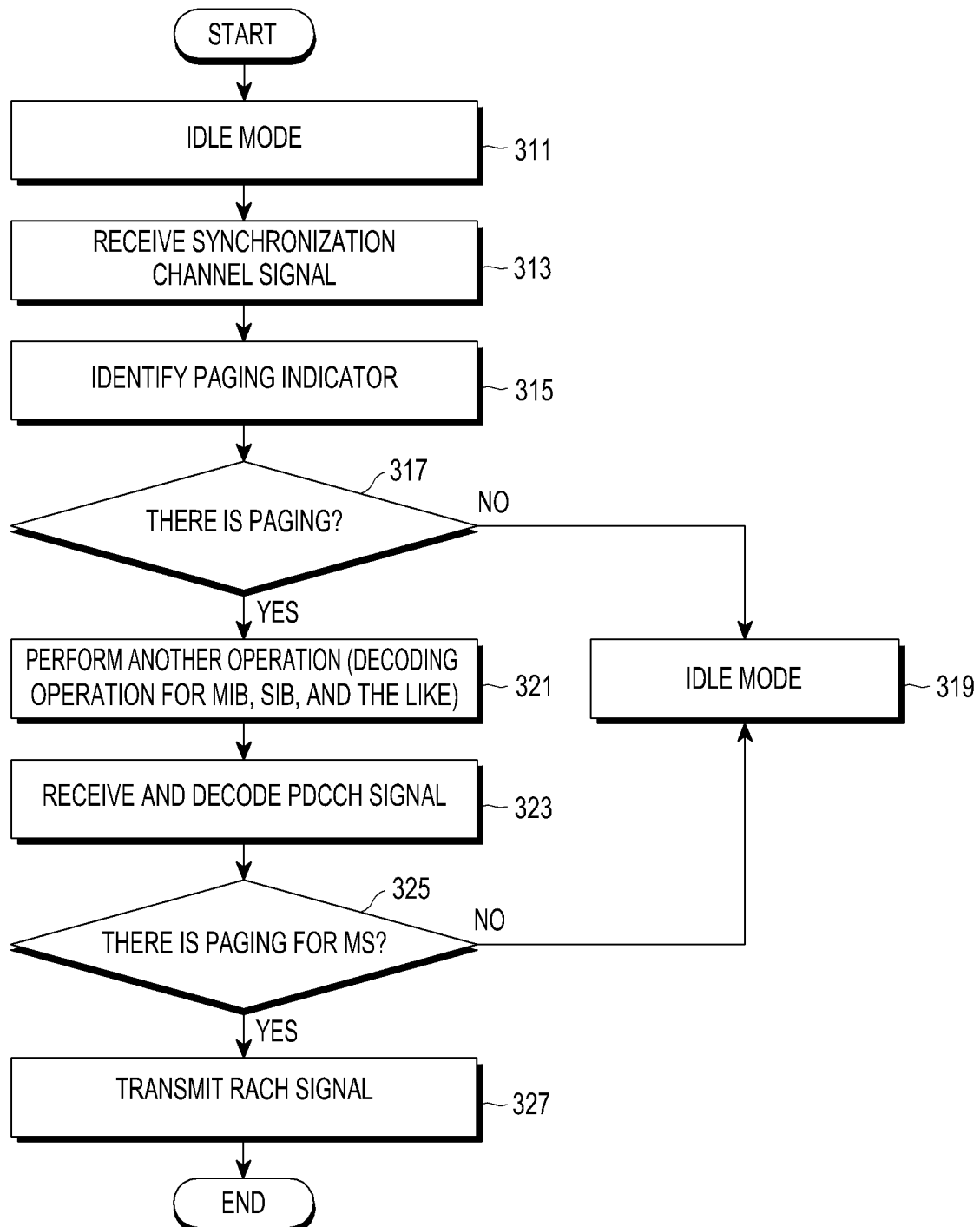
FIG. 3 schematically illustrates an example of a process for performing a paging process in a mobile station (MS) in a wireless communication system according to an embodiment of the present disclosure.

FIG. 3 schematically illustrates an example of a process for performing a paging process in an MS in a wireless communication system according to an embodiment of the present disclosure.

Referring to FIG. 3, an MS identifies that a discontinuous reception (DRX) timer has expired while operating in an idle mode and wakes up at operation 311. The MS receives a synchronization channel signal, e.g., a PSS signal, an SSS signal, and the like at operation 313. The MS identifies a paging indicator included in the synchronization channel at operation 315. The MS determines whether the paging indicator indicates that there is paging at operation 317. If the paging indicator does not indicate that there is the paging, that is, if the paging indicator indicates that there is no paging, the MS transits to the idle mode at operation 319.

If the paging indicator indicates that there is the paging, the MS performs another operation, i.e., another operation for receiving a PDCCH signal in which a paging message is included, e.g., a decoding operation for an MIB, an SIB, and the like at operation 321. The MS receives and decodes a PDCCH signal to identify a paging message at operation 323. The MS determines whether there is paging for the MS based on the identified paging message at operation 325. If there is no paging for the MS, the MS proceeds to operation 319.

If there is the paging for the MS, the MS proceeds to operation 327. The MS performs a random access procedure with the BS since there is the paging for the MS at operation 327. That is, the MS transmits a random access channel (RACH) signal to the BS.

Although FIG. 3 illustrates an example of a process for performing a paging process in an MS in a wireless communication system according to an embodiment of the present disclosure, various changes could be made to FIG. 3. For example, although shown as a series of operations, various operations in FIG. 3 could overlap, occur in parallel, occur in a different order, or occur multiple times.

An example of a process for performing a paging process in an MS in a wireless communication system according to an embodiment of the present disclosure has been described with reference to FIG. 3, and an example of a process for performing a paging process in a wireless communication system according to an embodiment of the present disclosure will be described with reference to FIG. 4.

Figure 4:
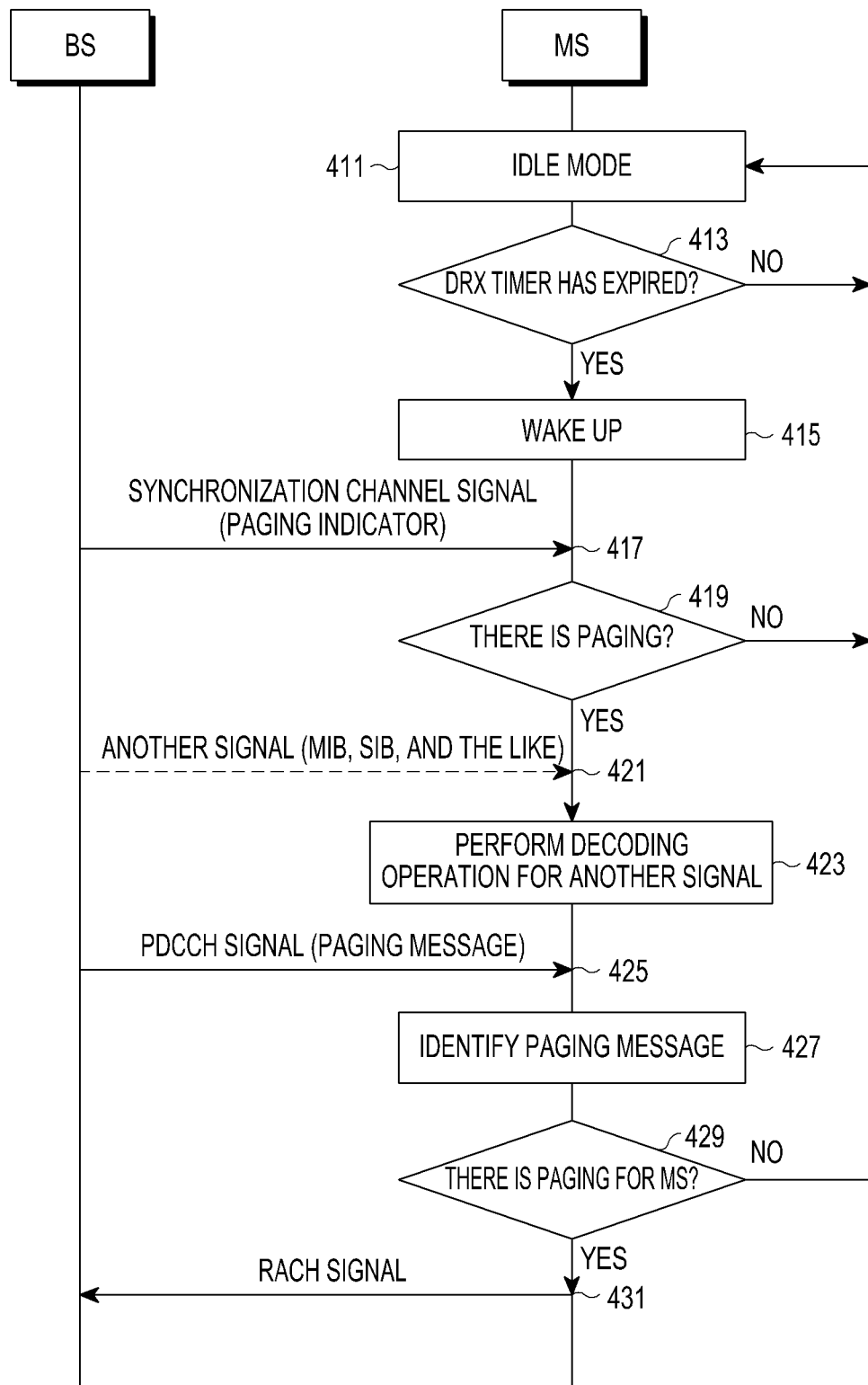
FIG. 4 schematically illustrates an example of a process for performing a paging process in a wireless communication system according to an embodiment of the present disclosure.

FIG. 4 schematically illustrates an example of a process for performing a paging process in a wireless communication system according to an embodiment of the present disclosure.

Referring to FIG. 4, an MS determines whether a DRX timer has expired at operation 413 while operating in an idle mode at operation 411. If the DRX timer has expired, the MS wakes up at operation 415 and receives a synchronization channel signal which is transmitted by a BS at operation 417. The MS determines whether there is paging based on a paging indicator included in the received synchronization channel signal at operation 419. If there is no paging, the MS transits to the idle mode.

If there is the paging, the MS receives another signal transmitted by the BS, i.e., another signal related to reception of PDCCH signal including a paging message, e.g., an MIB, an SIB, and the like at operation 421, and performs a decoding operation for the other signal, and the like at operation 423. The MS receives a PDCCH signal which is transmitted by the BS at operation 425, and identifies a paging message by performing a decoding operation for the PDCCH signal at operation 427. The MS determines whether there is paging for the MS based on the identified paging message at operation 429. If there is no paging for the MS, the MS transits to the idle mode at operation 411.

If there is the paging for the MS, the MS transmits an RACH signal to the BS at operation 431.

(2) Option 2

A paging indicator has been described in the option 1, so a description thereof will be omitted herein.

Another example of a process for performing a paging process in an MS in a wireless communication system according to an embodiment of the present disclosure will be described with reference to FIG. 5.

Figure 5:
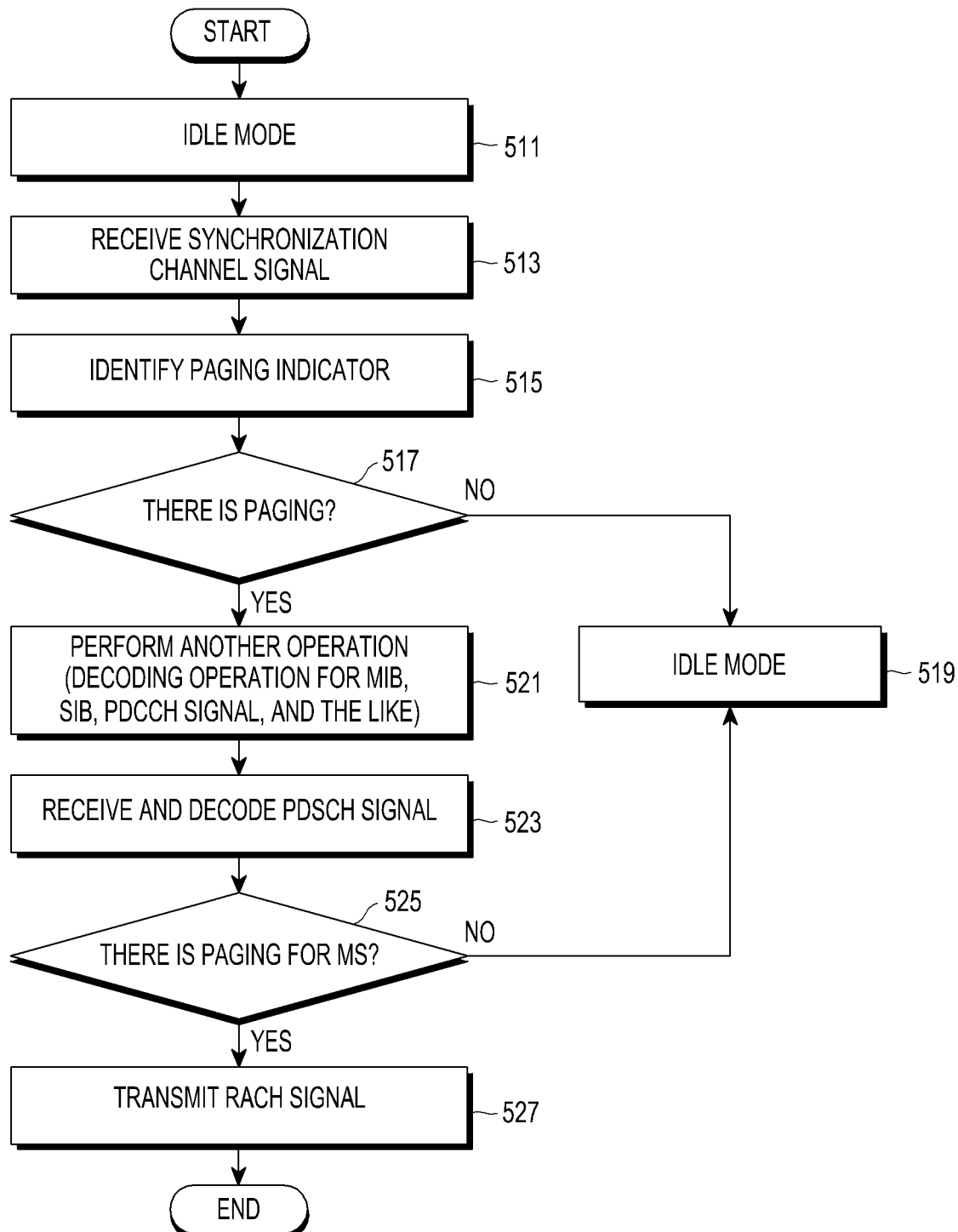
FIG. 5 schematically illustrates another example of a process for performing a paging process in an MS in a wireless communication system according to an embodiment of the present disclosure.

FIG. 5 schematically illustrates another example of a process for performing a paging process in an MS in a wireless communication system according to an embodiment of the present disclosure.

Referring to FIG. 5, operations 511 to 519 in FIG. 5 are identical to operations 311 to 319 in FIG. 3, so a description thereof will be omitted herein.

According to a determined result at operation 517, if a paging indicator indicates that there is paging, the MS performs another operation, i.e., another operation for receiving a PDSCH signal in which a paging message is included, e.g., a decoding operation for an MIB, an SIB, a PDCCH signal, and the like at operation 521. In a case that the MS may receive a PDSCH signal based on information such as an MS ID, a system frame number (SFN), and the like through system information (SI) or a software as well as control information which is transferred through a PDCCH, it will be understood by those of ordinary skill in the art that the MS does not perform the decoding operation for the PDCCH signal.

The MS decodes a PDSCH signal to identify a paging message at operation 523. The MS determines whether there is paging for the MS based on the identified paging message at operation 525. If there is no paging for the MS, the MS transits to an idle mode at operation 519.

If there is the paging for the MS, the MS proceeds to operation 527. The MS transmits an RACH signal to the BS since there is the paging for the MS at operation 527.

Although FIG. 5 illustrates another example of a process for performing a paging process in an MS in a wireless communication system according to an embodiment of the present disclosure, various changes could be made to FIG. 5. For example, although shown as a series of operations, various operations in FIG. 5 could overlap, occur in parallel, occur in a different order, or occur multiple times.

Another example of a process for performing a paging process in an MS in a wireless communication system according to an embodiment of the present disclosure has been described with reference to FIG. 5, and another example of a process for performing a paging process in a wireless communication system according to an embodiment of the present disclosure will be described with reference to FIG. 6.

Figure 6:
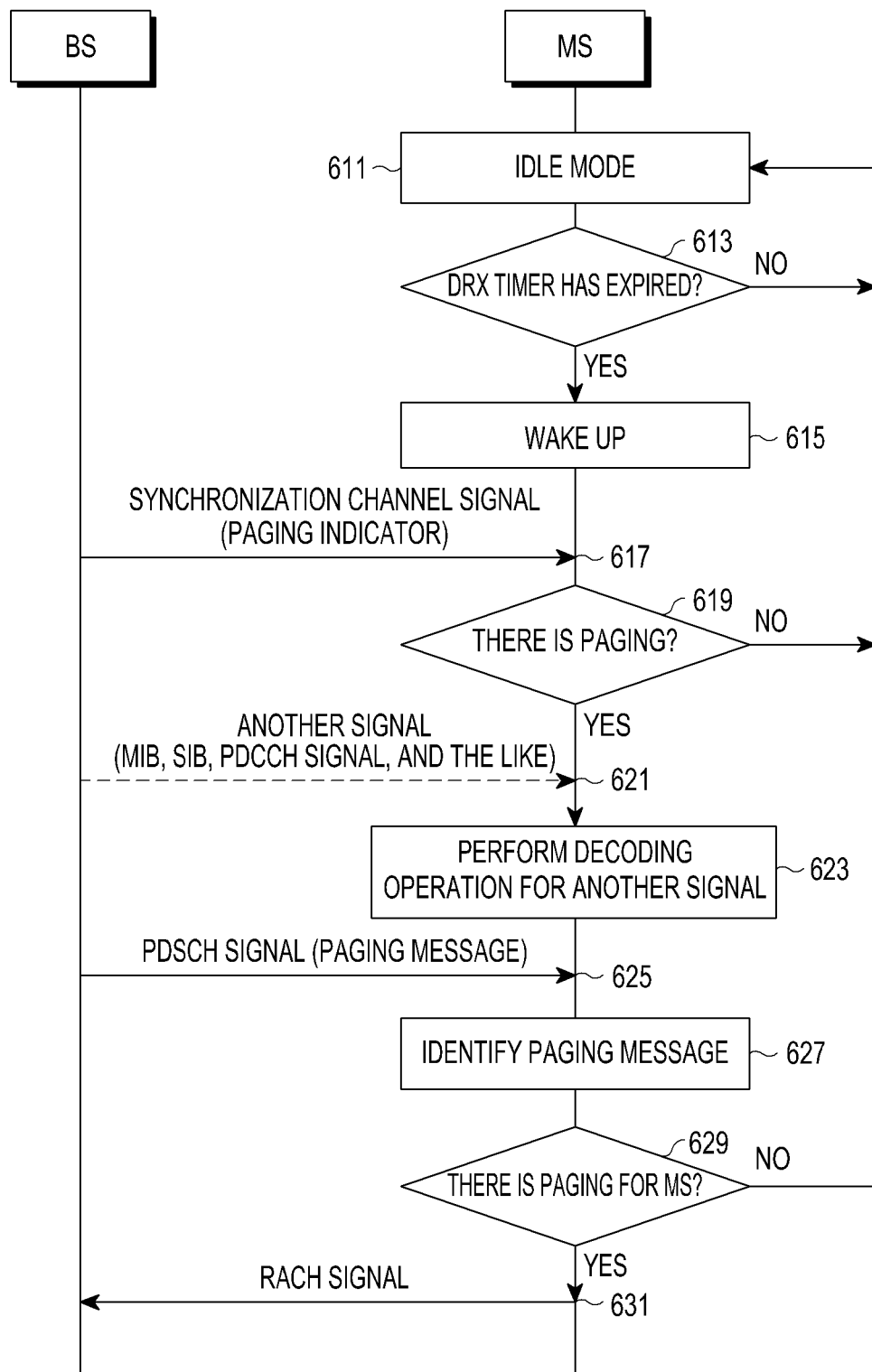
FIG. 6 schematically illustrates another example of a process for performing a paging process in a wireless communication system according to an embodiment of the present disclosure.

FIG. 6 schematically illustrates another example of a process for performing a paging process in a wireless communication system according to an embodiment of the present disclosure.

Referring to FIG. 6, operations 611 to 619 in FIG. 6 are identical to operations 411 to 419 in FIG. 4, so a description thereof will be omitted herein.

According to a determined result at operation 619, if a paging indicator indicates that there is paging, an MS receives another signal transmitted by a BS, i.e., another signal related to reception of PDSCH signal including a paging message, e.g., an MIB, an SIB, a PDCCH signal, and the like at operation 621, and performs a decoding operation for the other signal, and the like at operation 623. In a case that the MS may receive a PDSCH signal based on information such as an MS ID, an SFN, and the like through SI or a software as well as control information which is transferred through a PDCCH, it will be understood by those of ordinary skill in the art that the MS does not perform the decoding operation for the PDCCH signal.

The MS receives a PDSCH signal which is transmitted by the BS at operation 625, and identifies a paging message by performing a decoding operation for the PDSCH signal at operation 627. The MS determines whether there is paging for the MS based on the identified paging message at operation 629. If there is no paging for the MS, the MS transits to the idle mode at operation 611.

If there is the paging for the MS, the MS transmits an RACH signal to the BS at operation 631.

(3) Option 3

A paging indicator has been described in the option 1, so a description thereof will be omitted herein.

Another example of a process for performing a paging process in an MS in a wireless communication system according to an embodiment of the present disclosure will be described with reference to FIG. 7.

Figure 7:
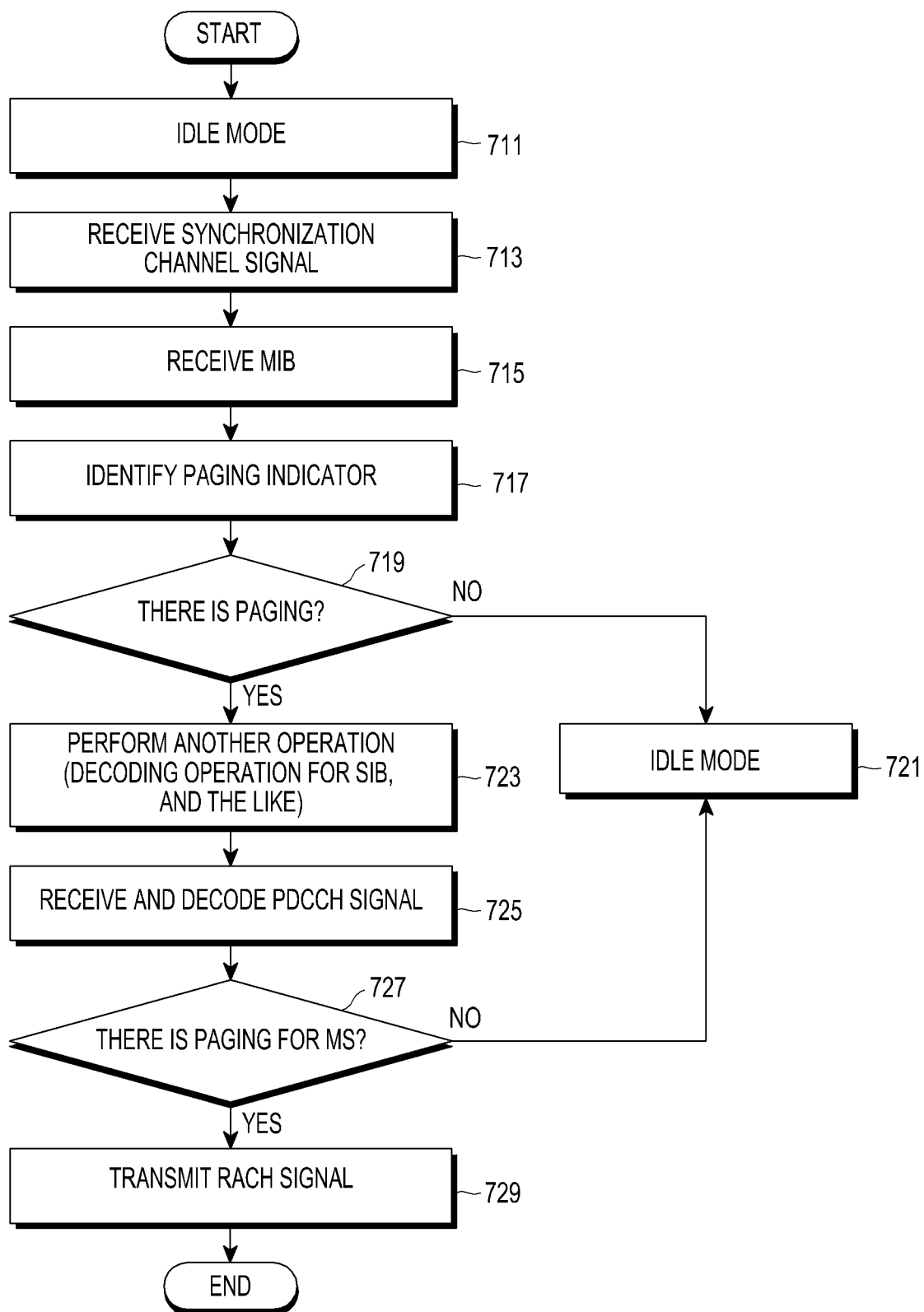
FIG. 7 schematically illustrates another example of a process for performing a paging process in an MS in a wireless communication system according to an embodiment of the present disclosure.

FIG. 7 schematically illustrates another example of a process for performing a paging process in an MS in a wireless communication system according to an embodiment of the present disclosure.

Referring to FIG. 7, operations 711 and 713 in FIG. 7 are identical to operations 311 and 313 in FIG. 3, so a description thereof will be omitted herein.

An MS receives an MIB at operation 715. For example, the MIB may be received through a physical broadcast channel (PBCH). The MS identifies a paging indicator from the MIB at operation 717. The MS determines whether the paging indicator indicates that there is paging at operation 719. If the paging indicator does not indicate that there is the paging, that is, if the paging indicator indicates that there is no paging, the MS transits to an idle mode at operation 721.

If the paging indicator indicates that there is the paging, the MS performs another operation, i.e., another operation for receiving a PDCCH signal in which a paging message is included, e.g., a decoding operation for an SIB, and the like at operation 723. The MS decodes a PDCCH signal to identify a paging message at operation 725. The MS determines whether there is paging for the MS based on the identified paging message at operation 727. If there is no paging for the MS, the MS proceeds to operation 721.

If there is the paging for the MS, the MS proceeds to operation 729. The MS transmits an RACH signal to the BS since there is the paging for the MS at operation 729.

Although FIG. 7 illustrates another example of a process for performing a paging process in an MS in a wireless communication system according to an embodiment of the present disclosure, various changes could be made to FIG. 7. For example, although shown as a series of operations, various operations in FIG. 7 could overlap, occur in parallel, occur in a different order, or occur multiple times.

Another example of a process for performing a paging process in an MS in a wireless communication system according to an embodiment of the present disclosure has been described with reference to FIG. 7, and another example of a process for performing a paging process in a wireless communication system according to an embodiment of the present disclosure will be described with reference to FIG. 8.

Figure 8:
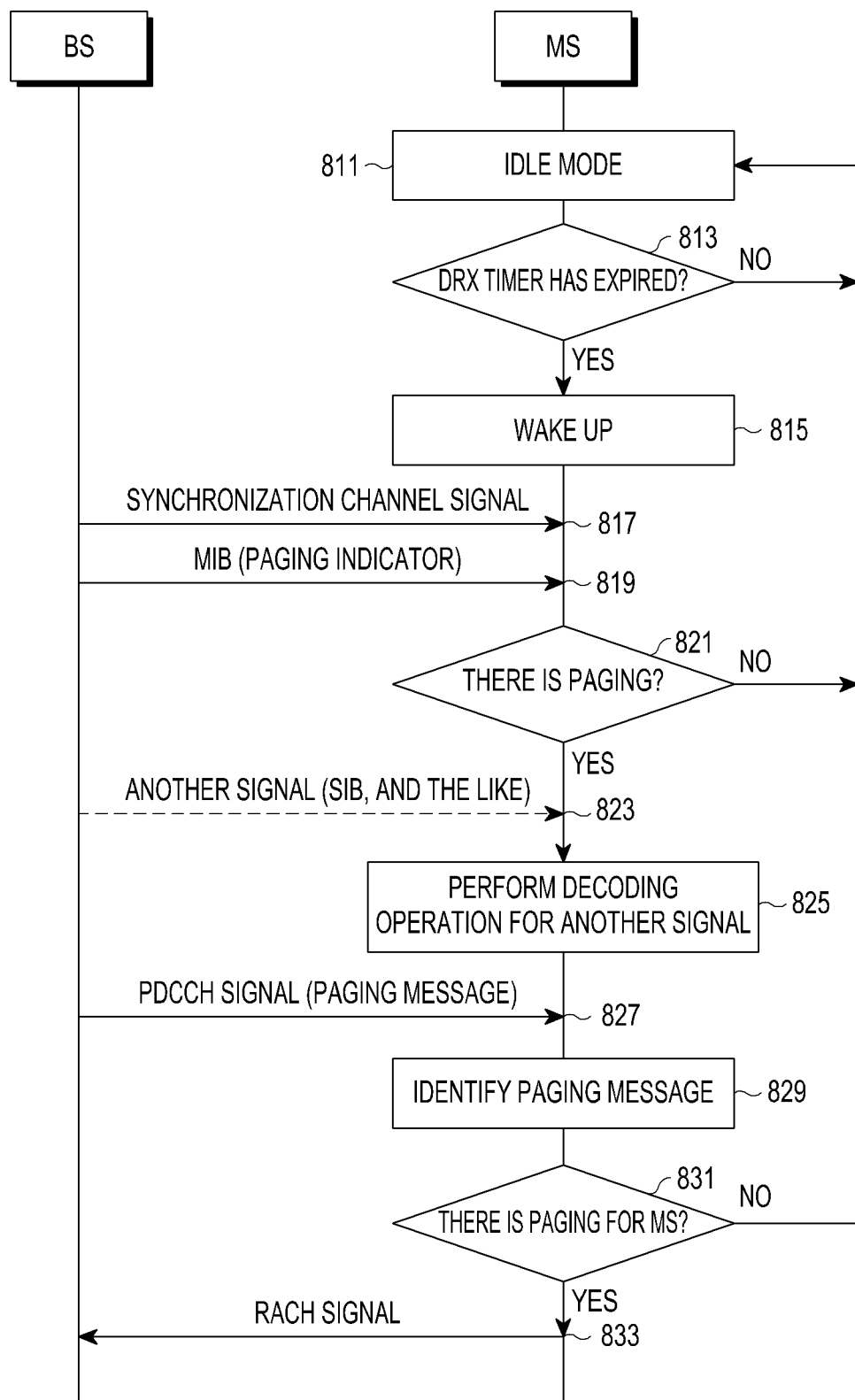
FIG. 8 schematically illustrates another example of a process for performing a paging process in a wireless communication system according to an embodiment of the present disclosure.

FIG. 8 schematically illustrates another example of a process for performing a paging process in a wireless communication system according to an embodiment of the present disclosure.

Referring to FIG. 8, operations 811 to 815 in FIG. 8 are identical to operations 411 to 415 in FIG. 4, so a description thereof will be omitted herein.

An MS receives a synchronization signal which is transmitted by a BS at operation 817, receives an MIB which is transmitted by the BS at operation 819 to identify a paging indicator from the MIB, and determines whether the identified paging indicator indicates that there is paging at operation 821. If the paging indicator indicates that there is the paging, the MS receives another signal transmitted by the BS, i.e., another signal related to reception of a PDCCH signal including a paging message, e.g., an MIB, an SIB, and the like at operation 823, and performs a decoding operation for the other signal, and the like at operation 825.

The MS receives a PDCCH signal which is transmitted by the BS at operation 827, and performs a decoding operation for the PDCCH signal to identify a paging message at operation 829. The MS determines whether there is paging for the MS based on the identified paging message at operation 831. If there is no paging for the MS, the MS transits to the idle mode at operation 811.

If there is the paging for the MS, the MS transmits an RACH signal to the BS at operation 833.

(4) Option 4

A paging indicator has been described in the option 1, so a description thereof will be omitted herein.

Another example of a process for performing a paging process in an MS in a wireless communication system according to an embodiment of the present disclosure will be described with reference to FIG. 9.

Figure 9:
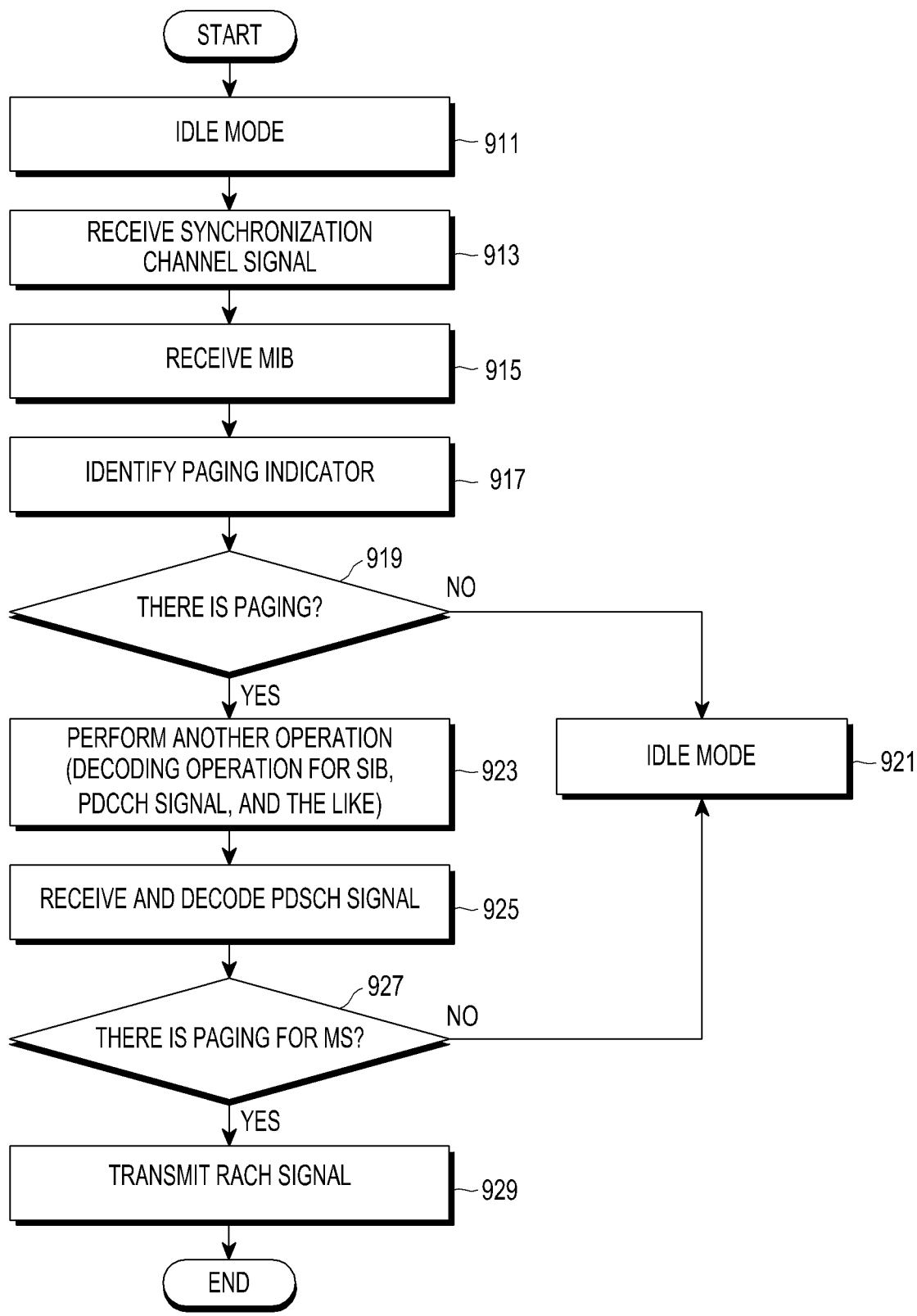
FIG. 9 schematically illustrates another example of a process for performing a paging process in an MS in a wireless communication system according to an embodiment of the present disclosure.

FIG. 9 schematically illustrates another example of a process for performing a paging process in an MS in a wireless communication system according to an embodiment of the present disclosure.

Referring to FIG. 9, operations 911 to 921 in FIG. 9 are identical to operations 711 to 721 in FIG. 7, so a description thereof will be omitted herein.

According to a determined result at operation 919, if a paging indicator indicates that there is paging, an MS performs another operation, i.e., another operation for receiving a PDSCH signal in which a paging message is included, e.g., a decoding operation for an SIB, a PDCCH signal, and the like at operation 923. In a case that the MS may receive a PDSCH signal based on information such as an MS ID, an SFN, and the like through SI or a software as well as control information which is transferred through a PDCCH, it will be understood by those of ordinary skill in the art that the MS does not perform the decoding operation for the PDCCH signal.

The MS decodes a PDSCH signal to identify a paging message at operation 925. The MS determines whether there is paging for the MS based on the identified paging message at operation 927. If there is no paging for the MS, the MS transits to an idle mode at operation 921.

If there is the paging for the MS, the MS proceeds to operation 929. The MS transmits an RACH signal to a BS since there is the paging for the MS at operation 929.

Although FIG. 9 illustrates another example of a process for performing a paging process in an MS in a wireless communication system according to an embodiment of the present disclosure, various changes could be made to FIG. 9. For example, although shown as a series of operations, various operations in FIG. 9 could overlap, occur in parallel, occur in a different order, or occur multiple times.

Another example of a process for performing a paging process in an MS in a wireless communication system according to an embodiment of the present disclosure has been described with reference to FIG. 9, and another example of a process for performing a paging process in a wireless communication system according to an embodiment of the present disclosure will be described with reference to FIG. 10.

Figure 10:
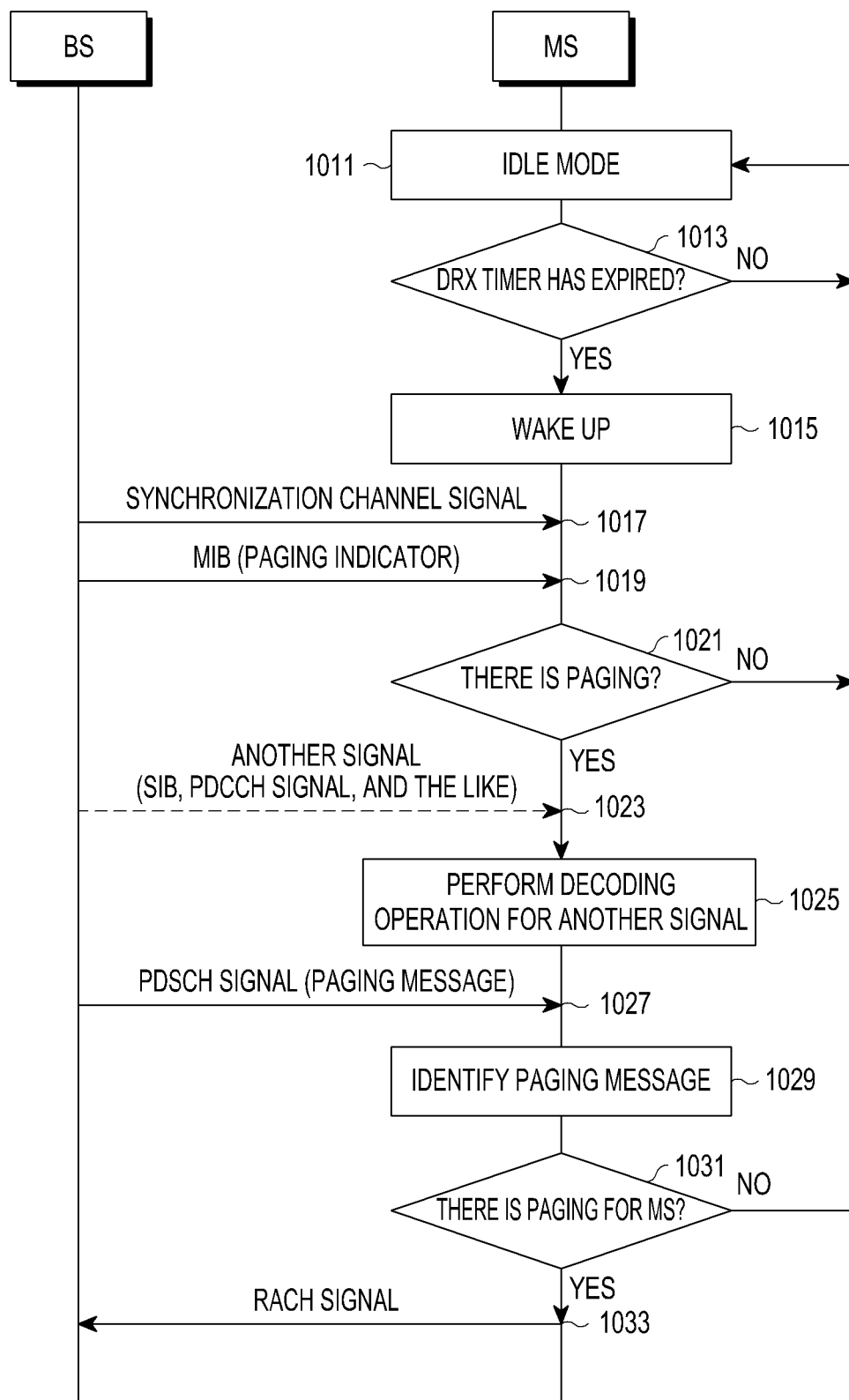
FIG. 10 schematically illustrates another example of a process for performing a paging process in a wireless communication system according to an embodiment of the present disclosure.

FIG. 10 schematically illustrates another example of a process for performing a paging process in a wireless communication system according to an embodiment of the present disclosure.

Referring to FIG. 10, operations 1011 to 1021 in FIG. 10 are identical to operations 811 to 821 in FIG. 8, so a description thereof will be omitted herein.

According to a determined result at operation 1021, if a paging indicator indicates that there is paging, an MS receives another signal transmitted by a BS, i.e., another signal related to reception of a PDSCH signal including a paging message, e.g., an SIB, and a PDCCH signal at operation 1023, and performs a decoding operation for the other signal, and the like at operation 1025. In a case that the MS may receive a PDSCH signal based on information such as an MS ID, an SFN, and the like through SI or a software as well as control information which is transferred through a PDCCH, it will be understood by those of ordinary skill in the art that the MS does not perform the decoding operation for the PDCCH signal.

The MS receives a PDSCH signal transmitted by the BS at operation 1027, and identifies a paging message by performing a decoding operation for the PDSCH signal at operation 1029. The MS determines whether there is paging for the MS based on the identified paging message at operation 1031. If there is no paging for the MS, the MS transits to an idle mode at operation 1011.

If there is the paging for the MS, the MS transmits an RACH signal to the BS at operation 1033.

(5) Option 5

A paging indicator has been described in the option 1, so a description thereof will be omitted herein.

Another example of a process for performing a paging process in an MS in a wireless communication system according to an embodiment of the present disclosure will be described with reference to FIG. 11.

Figure 11:
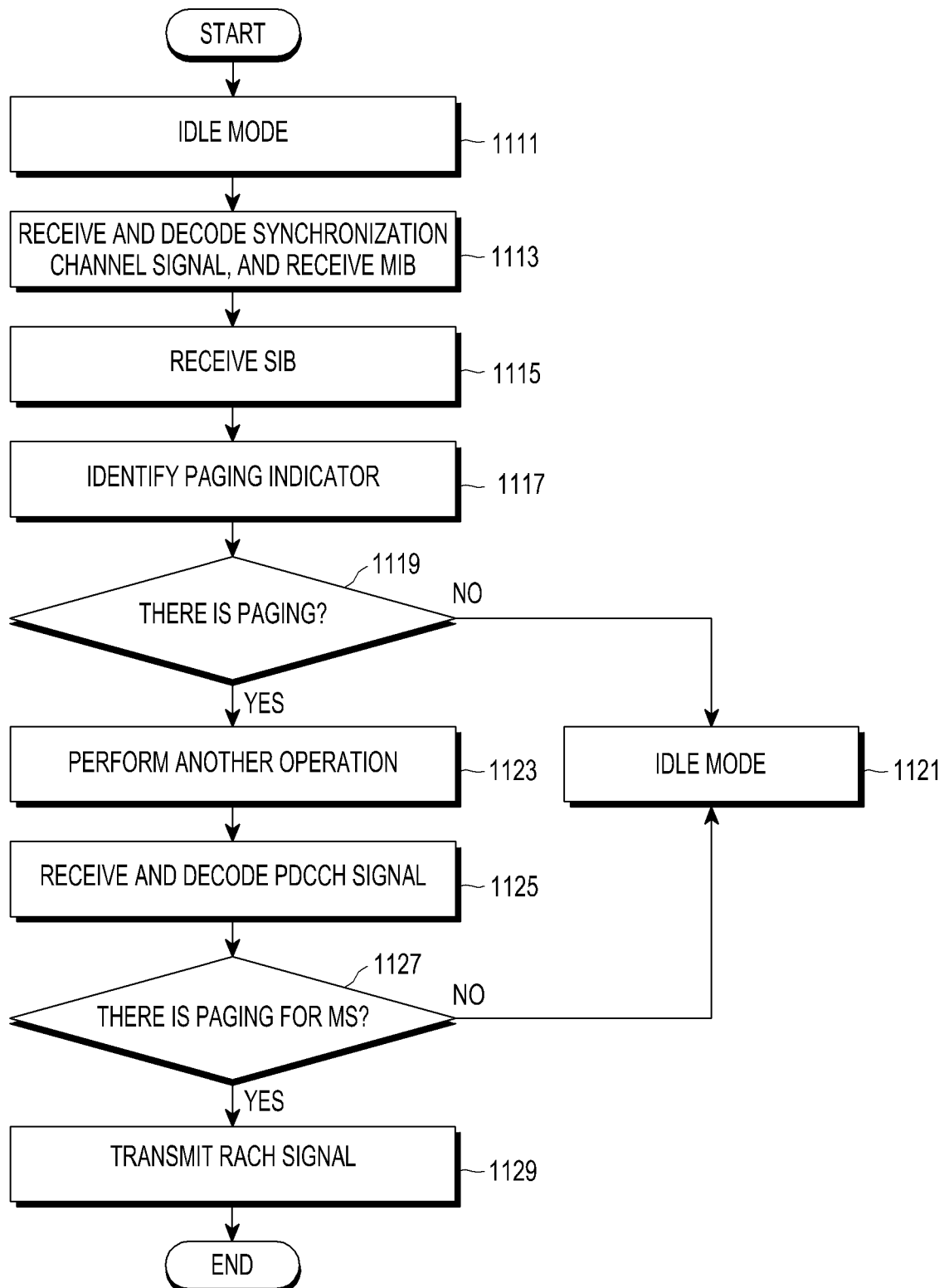
FIG. 11 schematically illustrates another example of a process for performing a paging process in an MS in a wireless communication system according to an embodiment of the present disclosure.

FIG. 11 schematically illustrates another example of a process for performing a paging process in an MS in a wireless communication system according to an embodiment of the present disclosure.

Referring to FIG. 11, operation 1111 in FIG. 11 is identical to operation 911 in FIG. 9, so a description thereof will be omitted herein.

An MS receives and decodes a synchronization channel signal such as a PSS, an SSS, and/or the like, and receives an MIB at operation 1113. The MS receives an SIB at operation 1115. The MS identifies a paging indicator from the SIB at operation 1117. The MS determines whether the paging indicator indicates that there is paging at operation 1119. If the paging indicator does not indicate that there is the paging, that is, if the paging indicator indicates that there is no paging, the MS transits to an idle mode at operation 1121.

If the paging indicator indicates that there is the paging, the MS performs another operation, i.e., another operation for receiving a PDCCH signal including a paging message, e.g., a decoding operation for another signal, and the like at operation 1123. The MS decodes a PDCCH signal to identify a paging message at operation 1125. The MS determines whether there is paging for the MS based on the identified paging message at operation 1127. If there is no paging for the MS, the MS proceeds to operation 1121.

If there is the paging for the MS, the MS proceeds to operation 1129. The MS transmits an RACH signal to a BS since there is the paging for the MS at operation 1129.

Although FIG. 11 illustrates another example of a process for performing a paging process in an MS in a wireless communication system according to an embodiment of the present disclosure, various changes could be made to FIG. 11. For example, although shown as a series of operations, various operations in FIG. 11 could overlap, occur in parallel, occur in a different order, or occur multiple times.

Another example of a process for performing a paging process in an MS in a wireless communication system according to an embodiment of the present disclosure has been described with reference to FIG. 11, and another example of a process for performing a paging process in a wireless communication system according to an embodiment of the present disclosure will be described with reference to FIG. 12.

Figure 12:
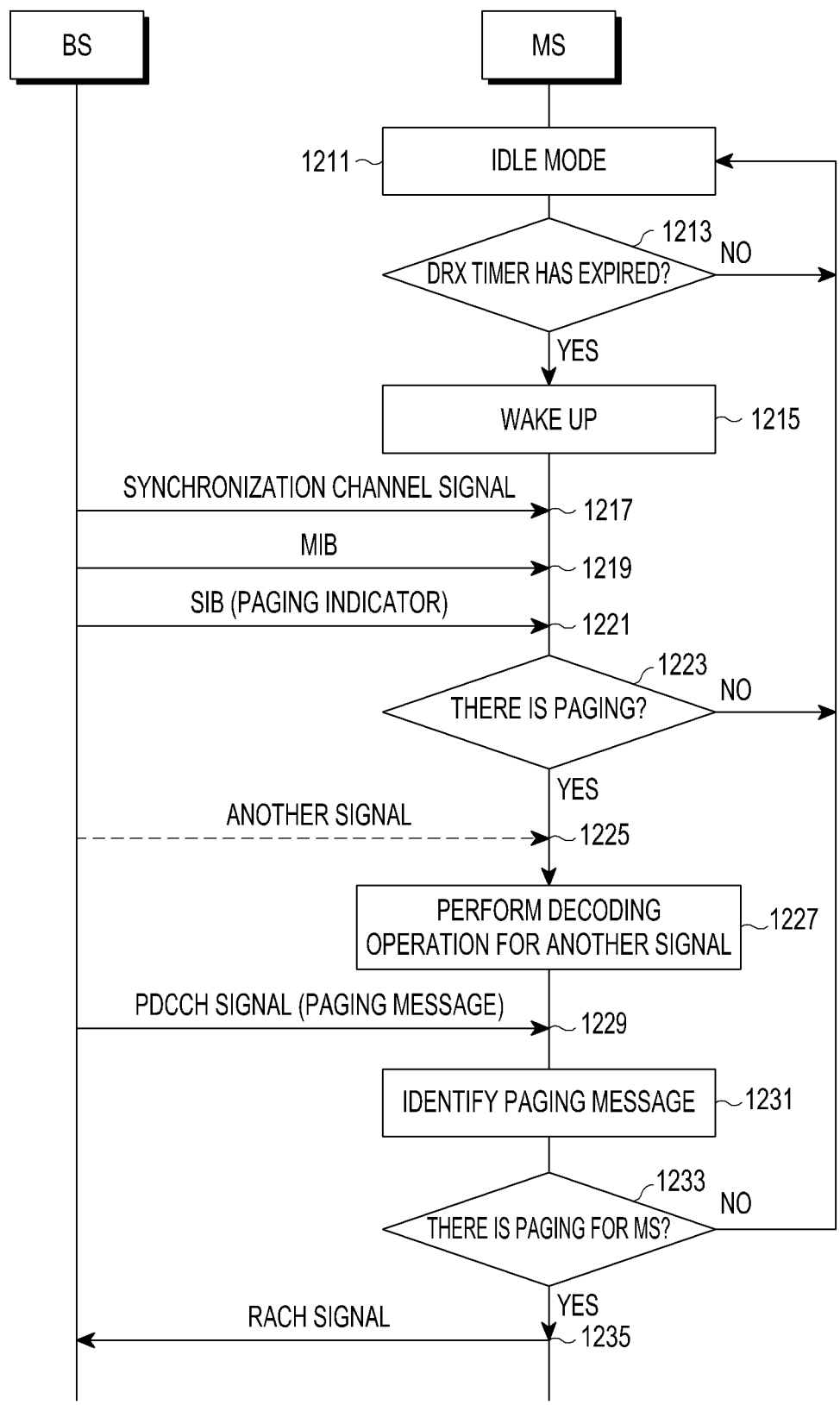
FIG. 12 schematically illustrates another example of a process for performing a paging process in a wireless communication system according to an embodiment of the present disclosure.

FIG. 12 schematically illustrates another example of a process for performing a paging process in a wireless communication system according to an embodiment of the present disclosure.

Referring to FIG. 12, operations 1211 to 1217 in FIG. 12 are identical to operations 1011 to 1017 in FIG. 10, so a description thereof will be omitted herein.

An MS receives an MIB transmitted by a BS at operation 1219, receives an SIB transmitted by the BS at operation 1221 to identify a paging indicator from the MIB, and determines whether the identified paging indicator indicates that there is paging at operation 1223. If the paging indicator indicates that there is the paging, the MS receives another signal transmitted by the BS, i.e., another signal related to reception of a PDCCH signal including a paging message at operation 1225, and performs a decoding operation for the other signal, and the like at operation 1227.

The MS receives a PDCCH signal transmitted by the BS at operation 1229, and identifies a paging message by performing a decoding operation for the PDCCH signal at operation 1231. The MS determines whether there is paging for the MS based on the identified paging message at operation 1233. If there is no paging for the MS, the MS transits to an idle mode at operation 1211.

If there is the paging for the MS, the MS transmits an RACH signal to the BS at operation 1235.

(6) Option 6

A paging indicator has been described in the option 1, so a description thereof will be omitted herein.

Another example of a process for performing a paging process in an MS in a wireless communication system according to an embodiment of the present disclosure will be described with reference to FIG. 13.

Figure 13:
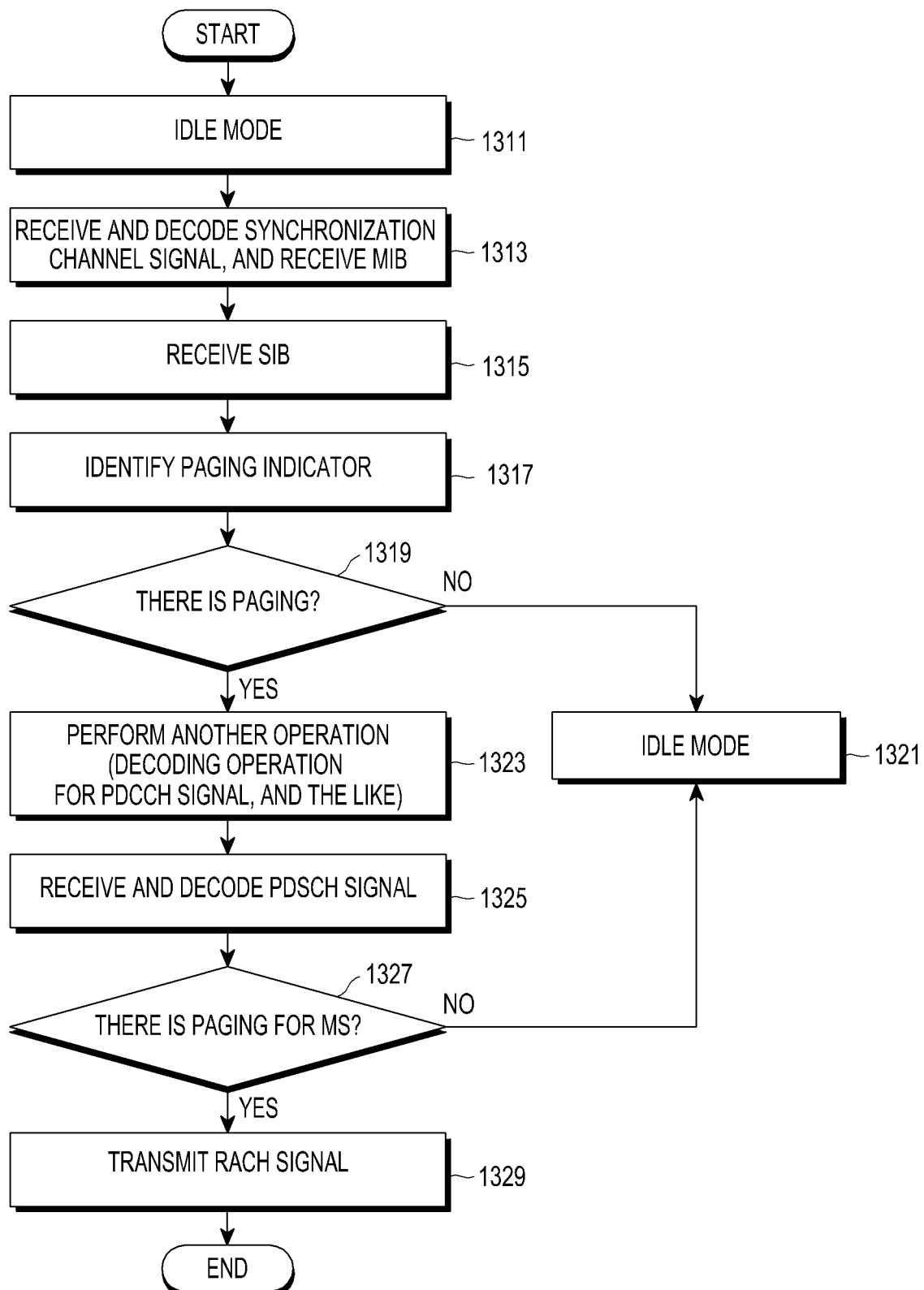
FIG. 13 schematically illustrates another example of a process for performing a paging process in an MS in a wireless communication system according to an embodiment of the present disclosure.

FIG. 13 schematically illustrates another example of a process for performing a paging process in an MS in a wireless communication system according to an embodiment of the present disclosure.

Referring to FIG. 13, operations 1311 to 1321 in FIG. 13 are identical to operations 1111 to 1121 in FIG. 11, so a description thereof will be omitted herein.

According to a determined result at operation 1319, if a paging indicator indicates that there is paging, an MS performs another operation, i.e., another operation for receiving a PDSCH signal including a paging message, e.g., a decoding operation for a PDCCH signal, and the like at operation 1323. In a case that the MS may receive a PDSCH signal based on information such as an MS ID, an SFN, and the like through SI or a software as well as control information which is transferred through a PDCCH, it will be understood by those of ordinary skill in the art that the MS does not perform the decoding operation for the PDCCH signal.

The MS decodes a PDSCH signal to identify a paging message at operation 1325. The MS determines whether there is paging for the MS based on the identified paging message at operation 1327. If there is no paging for the MS, the MS transits to an idle mode at operation 1321.

If there is the paging for the MS, the MS proceeds to operation 1329. The MS transmits an RACH signal to a BS since there is the paging for the MS at operation 1329.

Although FIG. 13 illustrates another example of a process for performing a paging process in an MS in a wireless communication system according to an embodiment of the present disclosure, various changes could be made to FIG. 13. For example, although shown as a series of operations, various operations in FIG. 13 could overlap, occur in parallel, occur in a different order, or occur multiple times.

Another example of a process for performing a paging process in an MS in a wireless communication system according to an embodiment of the present disclosure has been described with reference to FIG. 13, and another example of a process for performing a paging process in a wireless communication system according to an embodiment of the present disclosure will be described with reference to FIG. 14.

Figure 14:
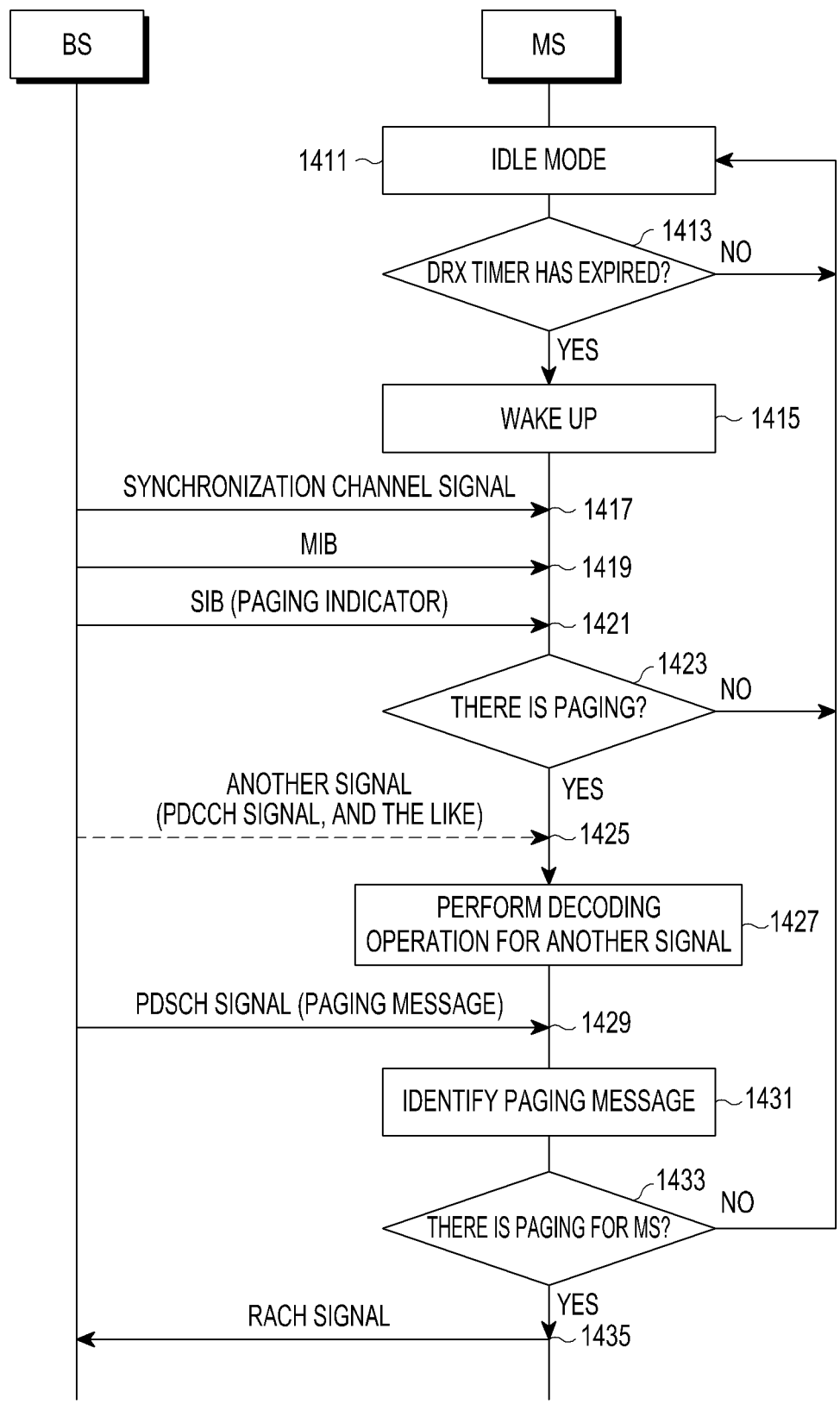
FIG. 14 schematically illustrates another example of a process for performing a paging process in a wireless communication system according to an embodiment of the present disclosure.

FIG. 14 schematically illustrates another example of a process for performing a paging process in a wireless communication system according to an embodiment of the present disclosure.

Referring to FIG. 14, operations 1411 to 1423 in FIG. 14 are identical to operations 1211 to 1223 in FIG. 12, so a description thereof will be omitted herein.

According to a determined result at operation 1423, if a paging indicator indicates that there is paging, an MS receives another signal transmitted by a BS, i.e., another signal related to reception of a PDSCH signal including a paging message, e.g., a PDCCH signal, and the like at operation 1425, and performs a decoding operation for the other signal, and the like at operation 1427. In a case that the MS may receive a PDSCH signal based on information such as an MS ID, an SFN, and the like through SI or a software as well as control information which is transferred through a PDCCH, it will be understood by those of ordinary skill in the art that the MS does not perform the decoding operation for the PDCCH signal.

The MS receives a PDSCH signal transmitted by the BS at operation 1429, and identifies a paging message by performing a decoding operation for the PDSCH signal at operation 1431. The MS determines whether there is paging for the MS based on the identified paging message at operation 1433. If there is no paging for the MS, the MS transits to an idle mode at operation 1411.

If there is the paging for the MS, the MS transmits an RACH signal to the BS at operation 1435.

(7) Option 7

A paging indicator has been described in the option 1, so a description thereof will be omitted herein.

Another example of a process for performing a paging process in an MS in a wireless communication system according to an embodiment of the present disclosure will be described with reference to FIG. 15.

Figure 15:
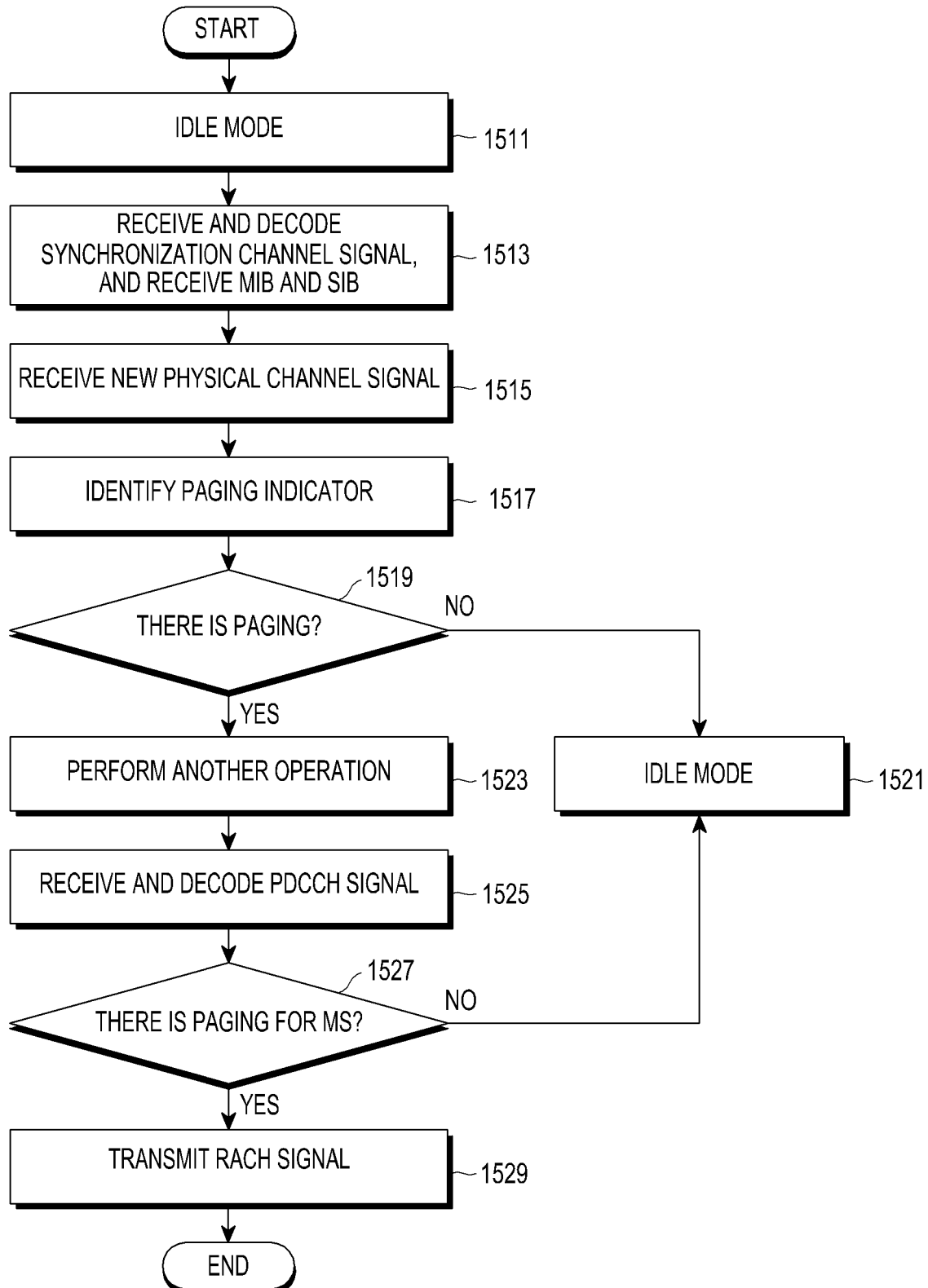
FIG. 15 schematically illustrates another example of a process for performing a paging process in an MS in a wireless communication system according to an embodiment of the present disclosure.

FIG. 15 schematically illustrates another example of a process for performing a paging process in an MS in a wireless communication system according to an embodiment of the present disclosure.

Referring to FIG. 15, operation 1511 in FIG. 15 is identical to operation 911 in FIG. 9, so a description thereof will be omitted herein.

An MS receives and decodes a synchronization channel signal such as a PSS, an SSS, and/or the like, and receives an MIB and an SIB at operation 1513. The MS receives a new physical channel signal at operation 1515. The MS identifies a paging indicator from the new physical channel signal at operation 1517. The MS determines whether the paging indicator indicates that there is paging at operation 1519. If the paging indicator does not indicate that there is the paging, that is, if the paging indicator indicates that there is no paging, the MS transits to an idle mode at operation 1521.

If the paging indicator indicates that there is the paging, the MS performs another operation, i.e., another operation for receiving a PDCCH signal including a paging message, e.g., a decoding operation for another signal, and the like at operation 1523. The MS decodes a PDCCH signal to identify a paging message at operation 1525. The MS determines whether there is paging for the MS based on the identified paging message at operation 1527. If there is no paging for the MS, the MS proceeds to operation 1521.

If there is the paging for the MS, the MS proceeds to operation 1529. The MS transmits an RACH signal to a BS since there is the paging for the MS at operation 1529.

Although FIG. 15 illustrates another example of a process for performing a paging process in an MS in a wireless communication system according to an embodiment of the present disclosure, various changes could be made to FIG. 15. For example, although shown as a series of operations, various operations in FIG. 15 could overlap, occur in parallel, occur in a different order, or occur multiple times.

Another example of a process for performing a paging process in an MS in a wireless communication system according to an embodiment of the present disclosure has been described with reference to FIG. 15, and another example of a process for performing a paging process in a wireless communication system according to an embodiment of the present disclosure will be described with reference to FIG. 16.

Figure 16:
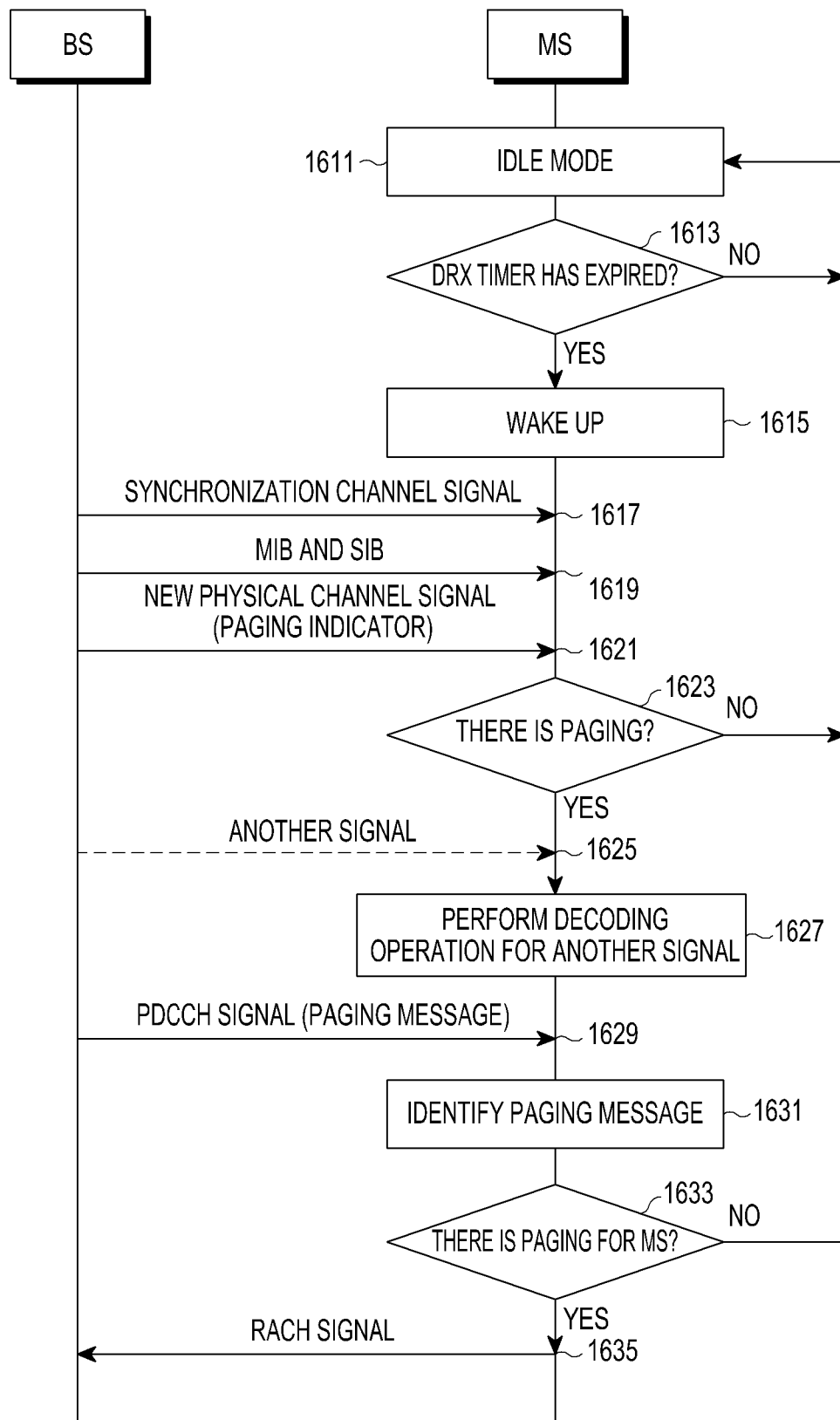
FIG. 16 schematically illustrates another example of a process for performing a paging process in a wireless communication system according to an embodiment of the present disclosure.

FIG. 16 schematically illustrates another example of a process for performing a paging process in a wireless communication system according to an embodiment of the present disclosure.

Referring to FIG. 16, operations 1611 to 1617 in FIG. 16 are identical to operations 1211 to 1217 in FIG. 12, so a detailed description will be omitted herein.

An MS receives an MIB and an SIB which are transmitted by a BS at operation 1619, receives a new physical channel signal transmitted by the BS at operation 1621 to identify a paging indicator from the new physical channel signal, and determines whether the identified paging indicator indicates that there is paging at operation 1623. If the paging indicator indicates that there is the paging, the MS receives another signal transmitted by the BS, i.e., another signal related to reception of a PDCCH signal including a paging message at operation 1625, and performs a decoding operation for the other signal, and the like at operation 1627.

The MS receives a PDCCH signal transmitted by the BS at operation 1629, and identifies a paging message by performing a decoding operation for the PDCCH signal at operation 1631. The MS determines whether there is paging for the MS based on the identified paging message at operation 1633. If there is no paging for the MS, the MS transits to an idle mode at operation 1611.

If there is the paging for the MS, the MS transmits an RACH signal to the BS at operation 1635.

(8) Option 8

A paging indicator has been described in the option 1, so a description thereof will be omitted herein.

Another example of a process for performing a paging process in an MS in a wireless communication system according to an embodiment of the present disclosure will be described with reference to FIG. 17.

Figure 17:
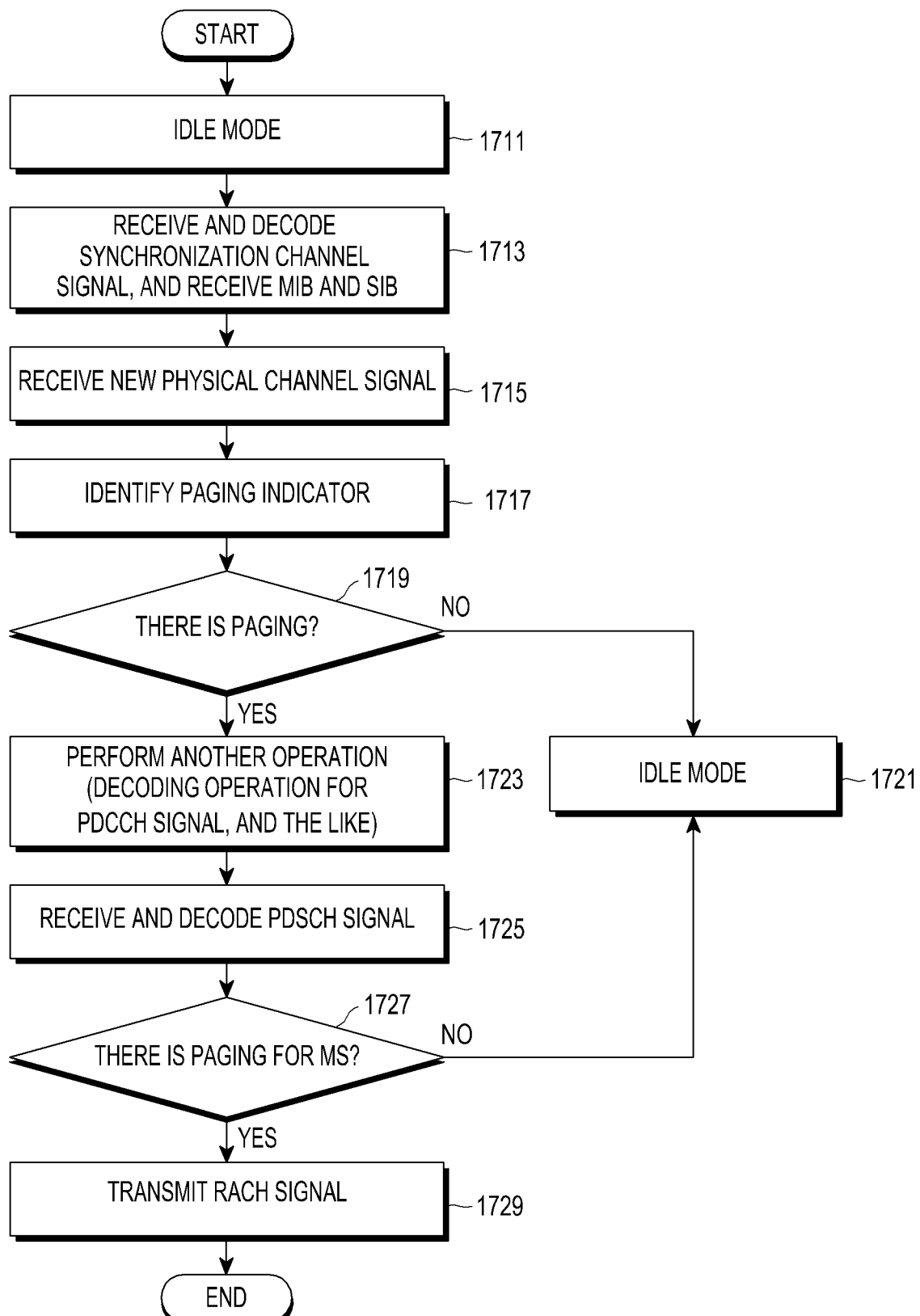
FIG. 17 schematically illustrates another example of a process for performing a paging process in an MS in a wireless communication system according to an embodiment of the present disclosure.

FIG. 17 schematically illustrates another example of a process for performing a paging process in an MS in a wireless communication system according to an embodiment of the present disclosure.

Referring to FIG. 17, operations 1711 to 1721 in FIG. 17 are identical to operations 1511 to 1521 in FIG. 15, so a description thereof will be omitted herein.

According to a determined result at operation 1719, if a paging indicator indicates that there is paging, an MS performs another operation, i.e., another operation for receiving a PDSCH signal including a paging message, e.g., a decoding operation for a PDCCH signal, and the like at operation 1723. In a case that the MS may receive a PDSCH signal based on information such as an MS ID, an SFN, and the like through SI or a software as well as control information which is transferred through a PDCCH, it will be understood by those of ordinary skill in the art that the MS does not perform the decoding operation for the PDCCH signal.

The MS decodes a PDSCH signal to identify a paging message at operation 1725. The MS determines whether there is paging for the MS based on the identified paging message at operation 1727. If there is no paging for the MS, the MS transits to an idle mode at operation 1721.

If there is the paging for the MS, the MS proceeds to operation 1729. The MS transmits an RACH signal to a BS since there is the paging for the MS at operation 1729.

Although FIG. 17 illustrates another example of a process for performing a paging process in an MS in a wireless communication system according to an embodiment of the present disclosure, various changes could be made to FIG. 17. For example, although shown as a series of operations, various operations in FIG. 17 could overlap, occur in parallel, occur in a different order, or occur multiple times.

Another example of a process for performing a paging process in an MS in a wireless communication system according to an embodiment of the present disclosure has been described with reference to FIG. 17, and another example of a process for performing a paging process in a wireless communication system according to an embodiment of the present disclosure will be described with reference to FIG. 18.

Figure 18:
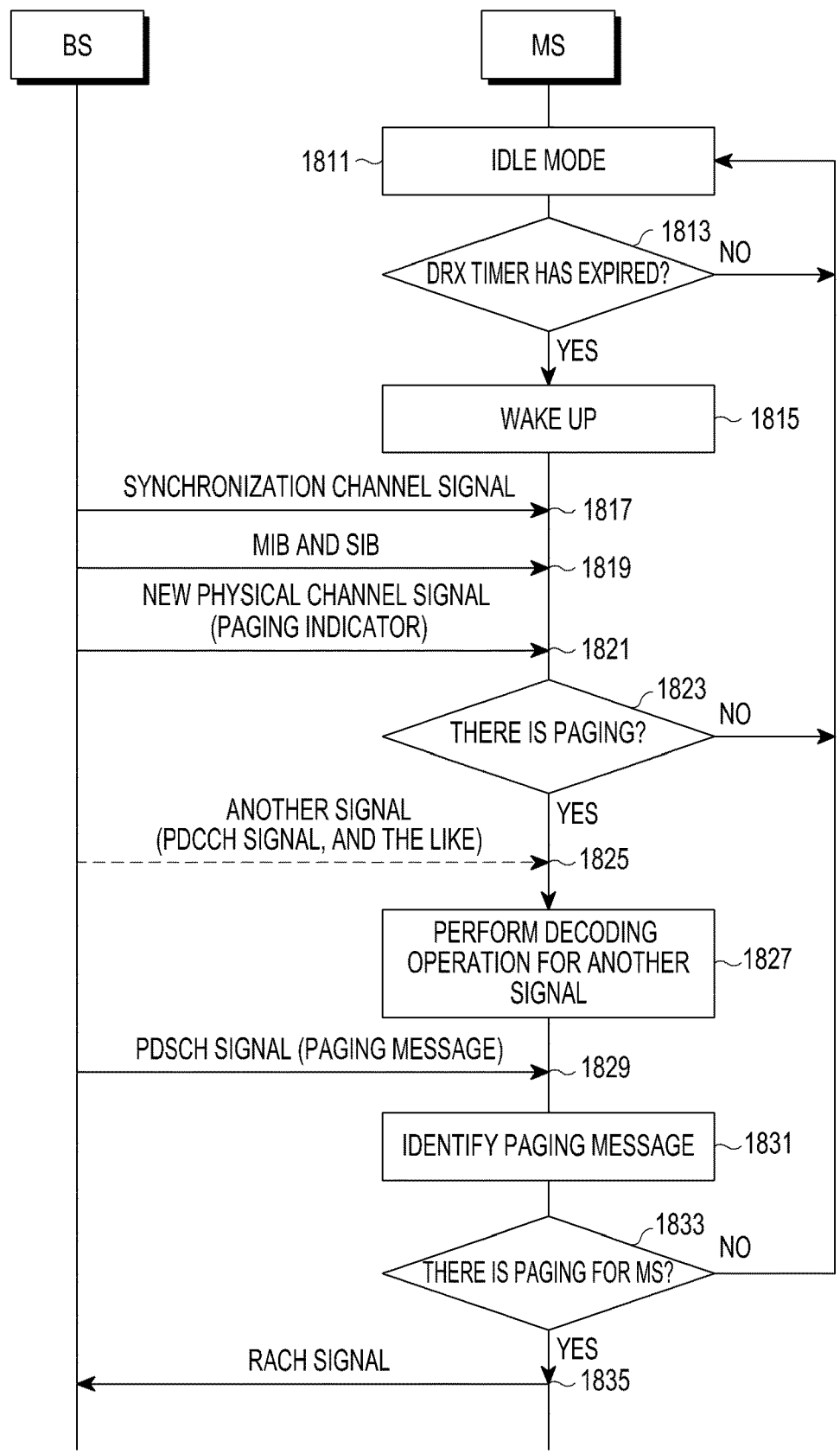
FIG. 18 schematically illustrates another example of a process for performing a paging process in a wireless communication system according to an embodiment of the present disclosure.

FIG. 18 schematically illustrates another example of a process for performing a paging process in a wireless communication system according to an embodiment of the present disclosure.

Referring to FIG. 18, operations 1811 to 1823 in FIG. 18 are identical to operations 1611 to 1623 in FIG. 16, so a description thereof will be omitted herein.

According to a determined result at operation 1823, if a paging indicator indicates that there is paging, an MS receives another signal transmitted by a BS, i.e., another signal related to reception of a PDSCH signal including a paging message, e.g., a PDCCH signal, and the like at operation 1825, and performs a decoding operation for the other signal, and the like at operation 1827. In a case that the MS may receive a PDSCH signal based on information such as an MS ID, an SFN, and the like through SI or a software as well as control information which is transferred through a PDCCH, it will be understood by those of ordinary skill in the art that the MS does not perform the decoding operation for the PDCCH signal.

The MS receives a PDSCH signal transmitted by the BS at operation 1829, and identifies a paging message by performing a decoding operation for the PDSCH signal at operation 1831. The MS determines whether there is paging for the MS based on the identified paging message at operation 1833. If there is no paging for the MS, the MS transits to an idle mode at operation 1811.

If there is the paging for the MS, the MS transmits an RACH signal to the BS at operation 1835.

(9) Option 9

A paging indicator has been described in the option 1, and a two-part group paging indicator will be described below.

The two-part group paging indicator may be implemented with various forms, and this will be described below.

Firstly, the two-part group paging indicator may be implemented with a paging-radio network temporary identity (P-RNTI) used in a general wireless communication system.

Secondly, the two-part group paging indicator may be implemented with a new type ID, and the two-part group paging indicator implemented with the new type ID is transmitted through a PDCCH.

Thirdly, the two-part group paging indicator may be implemented with parameters used in a general wireless communication system included in a PDCCH signal.

The two-part group paging indicator may be operated with various schemes, and this will be described below.

Firstly, the two-part group paging indicator may be operated with a bitmap form, and each of bits included in a bitmap may indicate whether there is paging for a related paging group.

Secondly, the two-part group paging indicator may be implemented with a value within a preset range, and MSs included in a related paging group which is based on a range of the value perform a related operation. This will be described below.

The range of the value may be differently set per coverage class. The reason why the range of the value is differently set per coverage class is that the number of distributed MSs may be different per coverage class. Generally, the number of MSs within a cell edge region is relatively greater than the number of the MSs within other regions, so the range of the value for a large coverage class may be wider.

An implementing form and an operating form of the two-part group paging indicator may be determined based on the number of coverage classes supported in a wireless communication system, the number of MSs which may be supported per cell, MS distribution density, a cell size, and the like.

Each of possible combinations of an implementing form and an operating form for the two-part group paging indicator is based on a coverage class according to a characteristic of a cellular IoT system, so a paging indicator and a paging message may be transmitted through different channels per coverage class.

An example of a paging process performed in a wireless communication system according to an embodiment of the present disclosure will be described with reference to FIG. 19.

Figure 19:
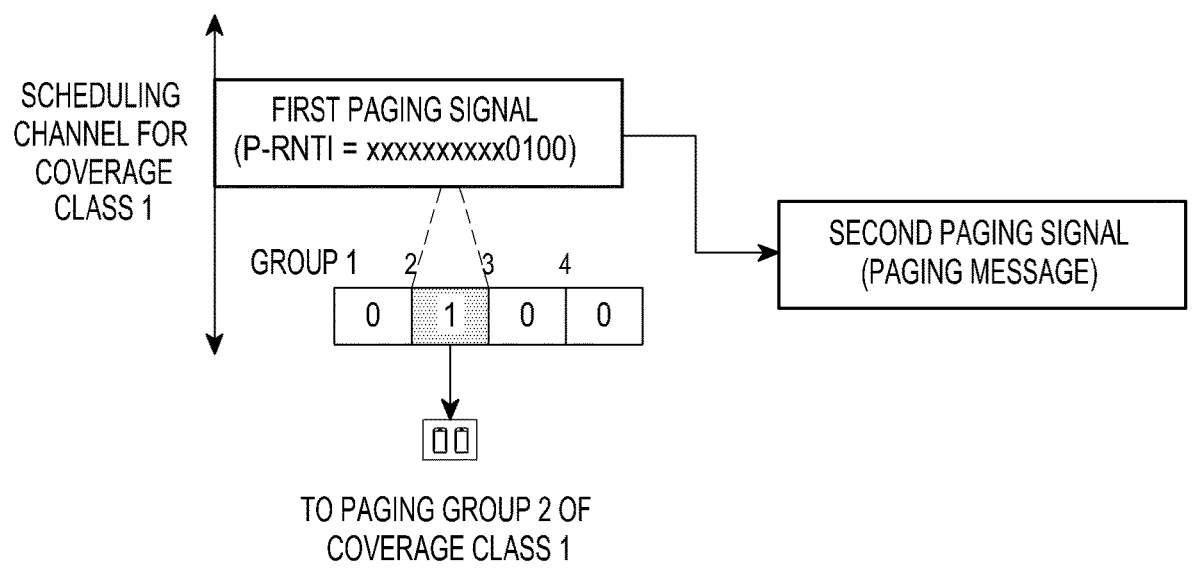
FIG. 19 schematically illustrates an example of a paging process performed in a wireless communication system according to an embodiment of the present disclosure.

FIG. 19 schematically illustrates an example of a paging process performed in a wireless communication system according to an embodiment of the present disclosure.

Referring to FIG. 19, it will be noted that a paging process in FIG. 19 is a paging process in a case that a paging indicator is implemented as a P-RNTI form, and the paging indicator is operated with a bitmap form.

As described in FIG. 19, in a case that a coverage class 1 is considered, a paging indicator is implemented with a P-RNTI form, a P-RNTI is implemented with 14 bits, and the paging indicator is implemented with a bitmap including four bits. If a value of the P-RNTI is "xxxxxxxxxx0100," the paging indicator indicates that there is paging for a group 2 among paging groups of the coverage class 1.

So, the group 2 of the coverage class 1 receives and decodes a paging message through a data channel for the coverage class 1.

The two-part group paging indicator includes a first part and a second part, and each of the first part and the second part will be described below.

The first part will be described below.

The first part is a common identification part, and a part which may be used by all of coverage classes supported in a wireless communication system. The first part is a part indicating a paging ID, and may be set to a pre-defined value indicating the paging ID.

The second part will be described below.

The second part is a paging group identification part, and may be independently used per coverage class. The second part indicates a group of MSs which need to receive a paging message, i.e., a paging group.

The first part may be used with various forms, this will be described below.

Firstly, the first part may be used for indicating a paging ID.

Secondly, the first part may be used for indicating a mobility MS group. That is, if MS mobility occurs, a paging process performed in a general wireless communication system performs a paging operation for a related MS based on a coverage class which was set when the MS lastly is attached (last coverage class), and performs a paging operation for the MS based on a maximum coverage class of the wireless communication system if there is no response for the paging operation for the MS from the MS. In this case, if mobility MS group indication for a mobility MS is possible, a BS includes a mobility MS group ID into the first part to transmit a paging indicator with a related mobility coverage class without performing a plurality of processes. So, paging MSs may be commonly operated per coverage class.

Thirdly, the first part may be used for all MSs to receive a paging message.

The second part may be used with various forms, and this will be described below.

As described above, the second part may be used for indicating a paging group per coverage class. Here, grouping of each MS and paging group generation within a coverage class may be determined based on the following criteria.

Firstly, paging group generation within a coverage class may be performed based on an MS ID.

A paging group within a coverage class is determined based on an MS ID such as an S-TMSI which is allocated to an MS when the MS is attached, an IMSI as an MS unique ID, or/and the like. The paging group within the coverage class is generated corresponding to one of the following schemes. Further, it will be understood by those of ordinary skill in the art that the paging group within the coverage class may be generated corresponding to schemes other than the following schemes, a detailed description thereof will be omitted herein.

The paging group within the coverage class is generated based on LSB n bits or MSB n bits of an MS ID.

Alternatively, the paging group within the coverage class is generated based on a modulo m operation for an MS ID.

Secondly, paging group generation within a coverage class may be performed based on an application or a service performed in an MS. The paging group within the coverage class is generated corresponding to one of the following schemes. Further, it will be understood by those of ordinary skill in the art that the paging group within the coverage class may be generated corresponding to schemes other than the following schemes, a detailed description thereof will be omitted herein.

The paging group within the coverage class is generated based on LSB n bits or MSB n bits of one of a service ID of a service performed in an MS and an application ID of an application performed in the MS.

Alternatively, the paging group within the coverage class is generated based on a modulo m operation for a service ID of a service performed in an MS or an application ID of an application performed in an MS.

Thirdly, paging group generation within a coverage class may be performed based on a location of an MS. The paging group within the coverage class is generated corresponding to one of the following schemes. Further, it will be understood by those of ordinary skill in the art that the paging group within the coverage class may be generated corresponding to schemes other than the following schemes, a detailed description thereof will be omitted herein.

The paging group within the coverage class is generated based on LSB n bits or MSB n bits of a GPS value for an MS.

Alternatively, the paging group within the coverage class is generated based on a modulo m operation for a GPS value for an MS.

Fourthly, paging group generation within a coverage class may be performed based on a device associated ID.

The paging group within the coverage class may be generated based on a device associated ID of a related MS, e.g., a sensor ID, a MAC address, an IP address, a product key, and the like. The paging group within the coverage class is generated corresponding to one of the following schemes. Further, it will be understood by those of ordinary skill in the art that the paging group within the coverage class may be generated corresponding to schemes other than the following schemes, a detailed description thereof will be omitted herein.

The paging group within the coverage class is generated based on LSB n bits or MSB n bits of a device associated ID.

Alternatively, the paging group within the coverage class is generated based on a modulo m operation for a device associated ID.

An operating example for a paging indicator in a wireless communication system according to an embodiment of the present disclosure will be described with reference to FIG. 20.

Figure 20:
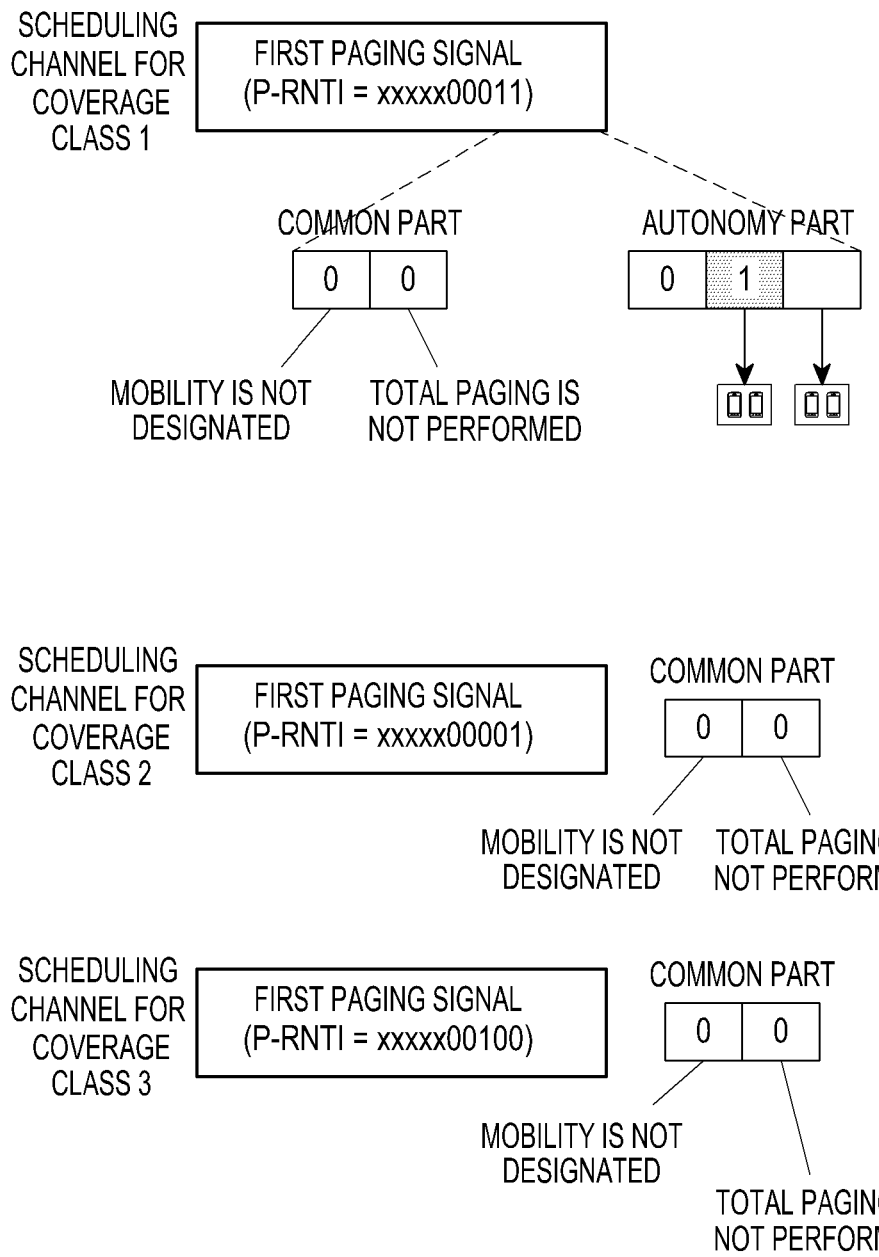
FIG. 20 schematically illustrates an operating example for a paging indicator in a wireless communication system according to an embodiment of the present disclosure.

FIG. 20 schematically illustrates an operating example for a paging indicator in a wireless communication system according to an embodiment of the present disclosure.

Referring to FIG. 20, a paging indicator is implemented with a P-RNTI form, and is operated with a bitmap form including 5 bits. The first 2 bits among the 5 bits are included in the first part, and remaining 3 bits are included in the second part. An operating example of a paging indicator for each of 3 coverage classes, i.e., a coverage class 1, a coverage class 2, and a coverage class 3 is illustrated in FIG. 20.

Firstly, a paging indicator for a coverage class 1 transmitted through a scheduling channel for the coverage class 1 is implemented with a P-RNTI form "xxxxx00011," so a value of the first part is "00," and a value of the second part is "011." If the value of the first part is "00," it means that mobility is not designated and total paging is not performed. If the value of the second part is "011," it means that there is paging for a paging group 2 and a paging group 3 among paging groups of the coverage class 1. That is, if the value of the second part is "011," it means that MS s included in the paging group 2 and the paging group 3 among the paging groups of the coverage class 1 need to receive and decode a paging message.

Secondly, a paging indicator for a coverage class 2 transmitted through a scheduling channel for the coverage class 2 is implemented with a P-RNTI form "xxxxx00001," so a value of the first part is "00," and a value of the second part is "001." If the value of the first part is "00," it means that mobility is not designated and total paging is not performed. If the value of the second part is "001," it means that there is paging for a paging group 3 among paging groups of the coverage class 2. That is, if the value of the second part is "001," it means that MSs included in the paging group 3 among the paging groups of the coverage class 2 need to receive and decode a paging message.

Thirdly, a paging indicator for a coverage class 3 transmitted through a scheduling channel for the coverage class 3 is implemented with a P-RNTI form "xxxxx00100," so a value of the first part is "00," and a value of the second part is "100." If the value of the first part is "00," it means that mobility is not designated and total paging is not performed. If the value of the second part is "100," it means that there is paging for a paging group 1 among paging groups of the coverage class 3. That is, if the value of the second part is "100," it means that MSs included in the paging group 1 among the paging groups of the coverage class 3 need to receive and decode a paging message.

An operating example for a paging indicator in a wireless communication system according to an embodiment of the present disclosure has been described with reference to FIG. 20, and another example of a process for performing a paging process in an MS in a wireless communication system according to an embodiment of the present disclosure will be described with reference to FIG. 21.

Figure 21:
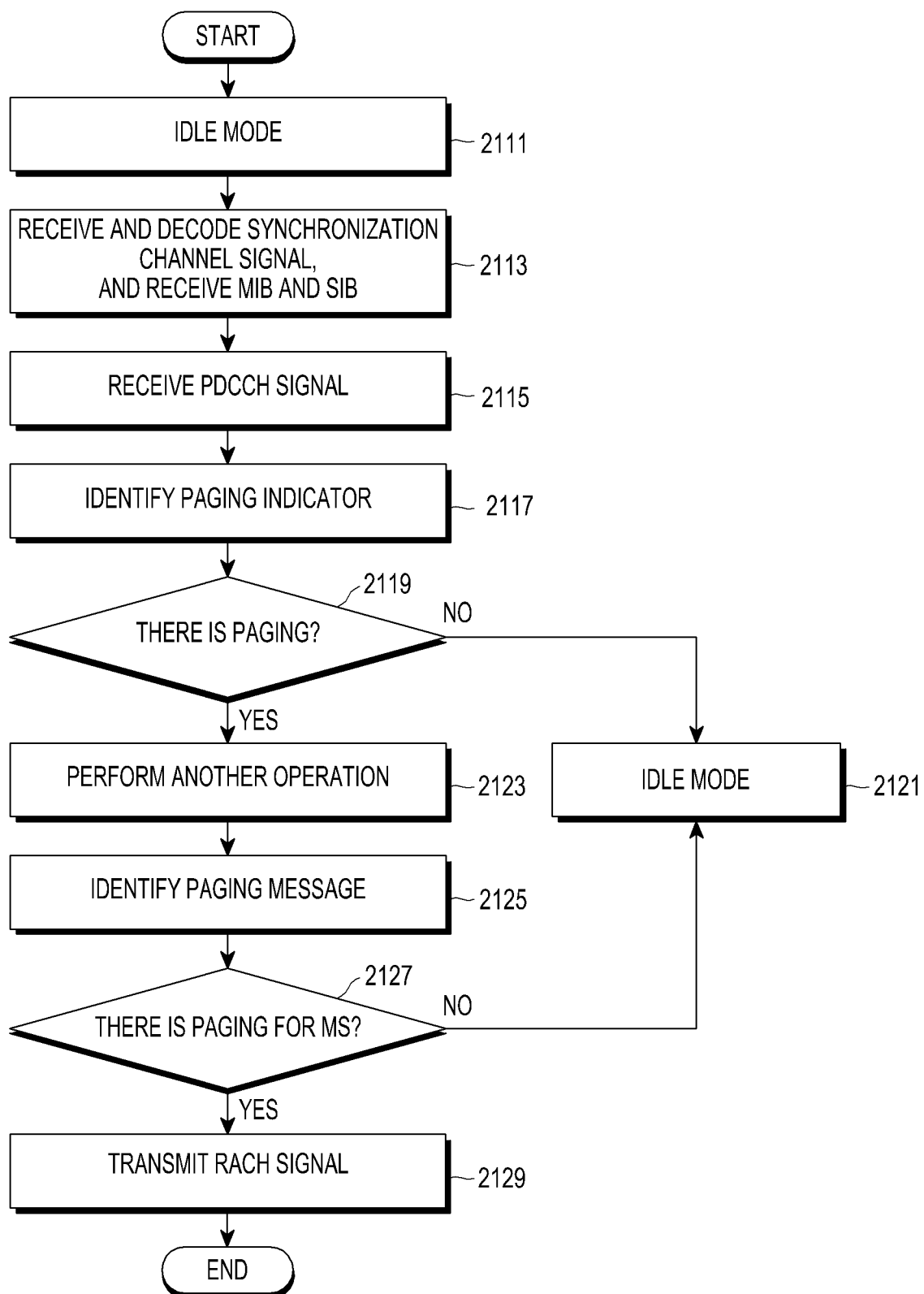
FIG. 21 schematically illustrates another example of a process for performing a paging process in an MS in a wireless communication system according to an embodiment of the present disclosure.

FIG. 21 schematically illustrates another example of a process for performing a paging process in an MS in a wireless communication system according to an embodiment of the present disclosure.

Referring to FIG. 21, operation 2111 in FIG. 21 is identical to operation 911 in FIG. 9, so a description thereof will be omitted herein.

An MS receives and decodes a synchronization signal such as a PSS, an SSS, and/or the like, and receives an MIB and an SIB at operation 2113. The MS receives a PDCCH signal at operation 2115. The MS identifies a paging indicator from the PDCCH signal at operation 2117. The MS determines whether the paging indicator indicates that there is paging at operation 2119. If the paging indicator does not indicate that there is the paging, that is, if the paging indicator indicates that there is no paging, the MS transits to an idle mode at operation 2121.

If the paging indicator indicates that there is the paging, the MS performs another operation, i.e., another operation for receiving a PDSCH signal including a paging message, e.g., a decoding operation for another signal, and the like at operation 2123. The MS decodes a PDSCH signal to identify a paging message at operation 2125. The MS determines whether there is paging for the MS based on the identified paging message at operation 2127. If there is no paging for the MS, the MS proceeds to operation 2121.

If there is the paging for the MS, the MS proceeds to operation 2129. The MS transmits an RACH signal to a BS since there is the paging for the MS at operation 2129.

Although FIG. 21 illustrates another example of a process for performing a paging process in an MS in a wireless communication system according to an embodiment of the present disclosure, various changes could be made to FIG. 21. For example, although shown as a series of operations, various operations in FIG. 21 could overlap, occur in parallel, occur in a different order, or occur multiple times.

Another example of a process for performing a paging process in an MS in a wireless communication system according to an embodiment of the present disclosure has been described with reference to FIG. 21, and another example of a process for performing a paging process in a wireless communication system according to an embodiment of the present disclosure will be described with reference to FIG. 22.

Figure 22:
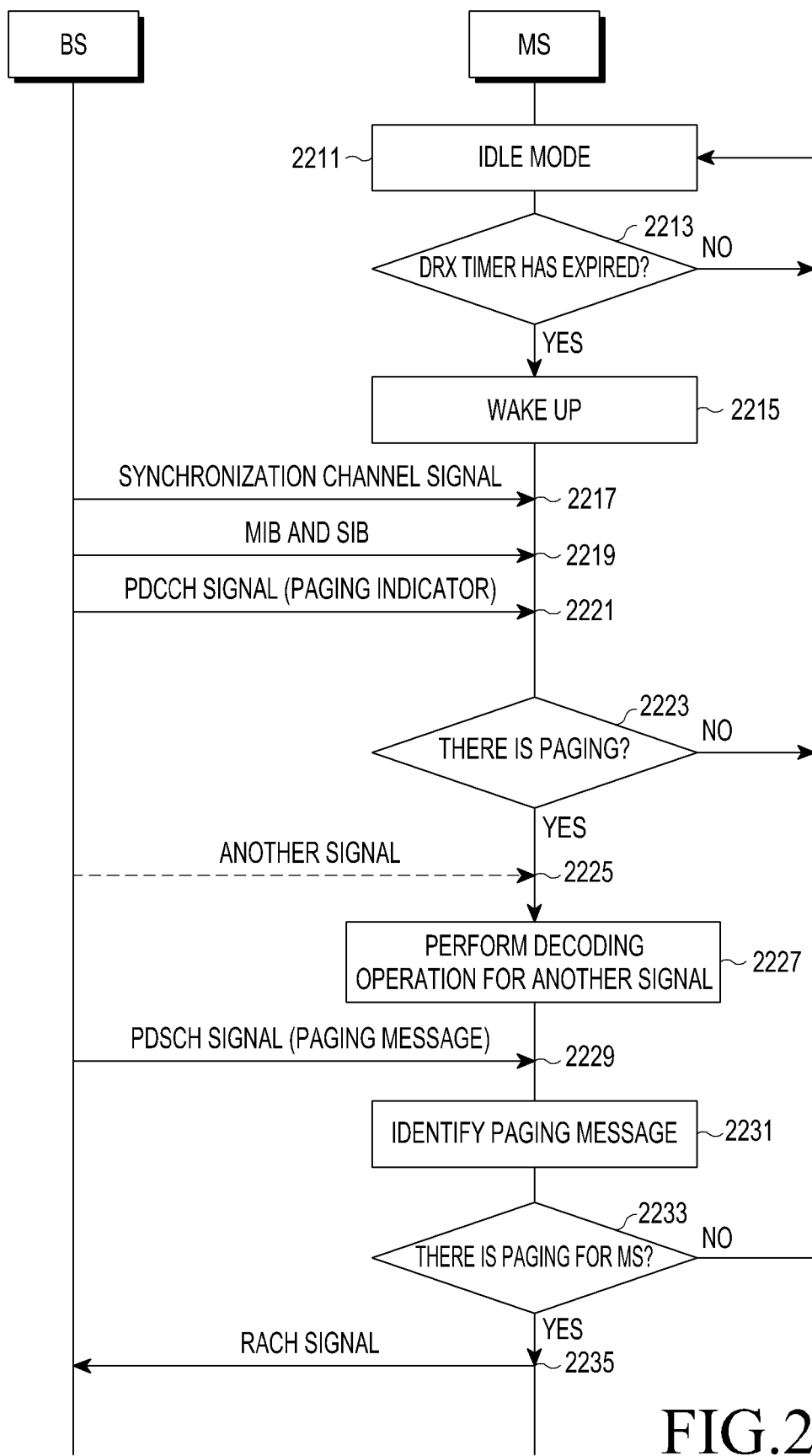
FIG. 22 schematically illustrates another example of a process for performing a paging process in a wireless communication system according to an embodiment of the present disclosure.

FIG. 22 schematically illustrates another example of a process for performing a paging process in a wireless communication system according to an embodiment of the present disclosure.

Referring to FIG. 22, operations 2211 to 2217 in FIG. 22 are identical to operations 1211 to 1217 in FIG. 12, so a description thereof will be omitted herein.

An MS receives an MIB and an SIB transmitted by a BS at operation 2219, receives a PDCCH signal transmitted by the BS at operation 2221 to identify a paging indicator from the PDCCH signal, and determines whether the identified paging indicator indicates that there is paging at operation 2223. If the paging indicator indicates that there is the paging, an MS receives another signal which is transmitted by the BS, i.e., another signal related to reception of a PDSCH signal including a paging message at operation 2225, and performs a decoding operation for the other signal, and the like at operation 2227.

The MS receives a PDSCH signal transmitted by the BS at operation 2229, and performs a decoding operation for the PDSCH signal to identify a paging message at operation 2231. The MS determines whether there is paging for the MS based on the identified paging message at operation 2233, and transits to the idle mode if there is no paging for the MS at operation 2211.

If there is the paging for the MS, the MS transmits an RACH signal to the BS at operation 2235.

An example of an MS in a wireless communication system according to an embodiment of the present disclosure will be described with reference to FIG. 23.

Figure 23:
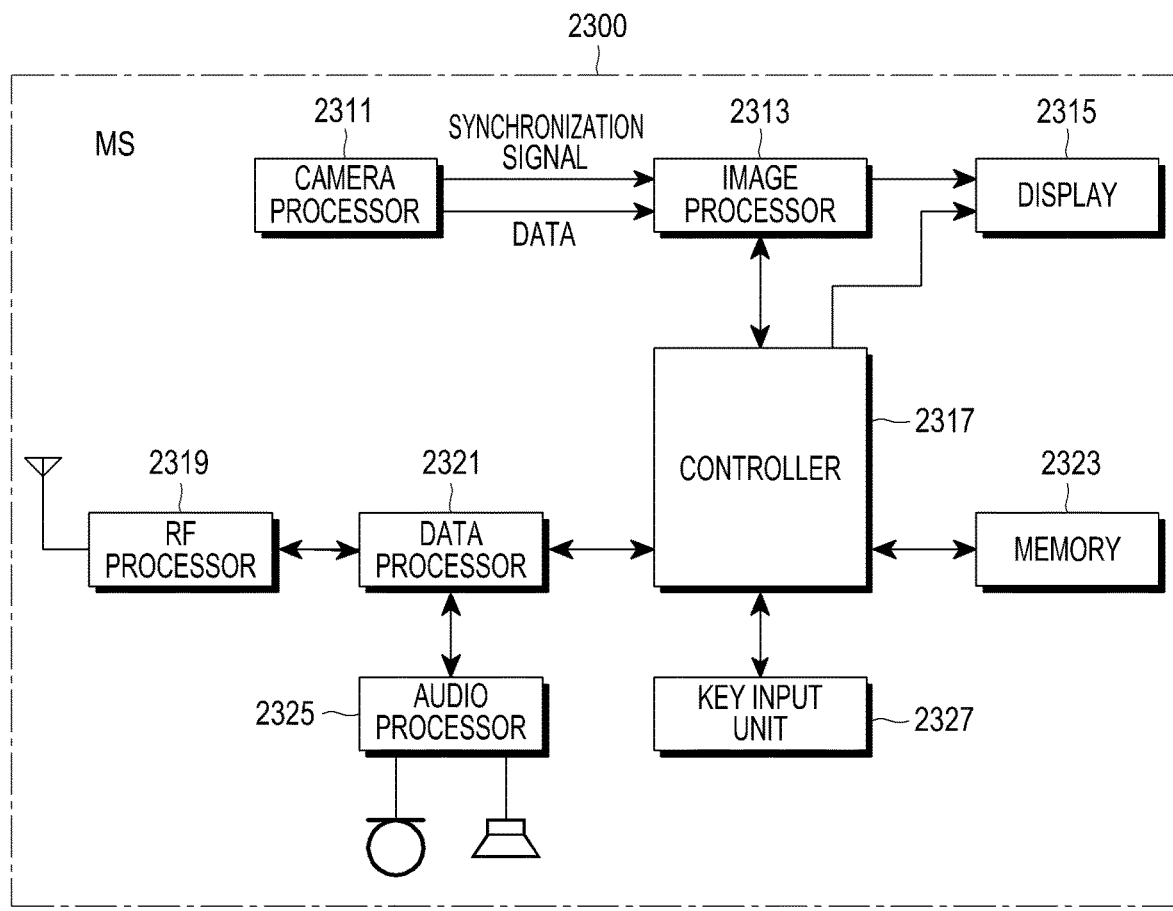
FIG. 23 schematically illustrates an example of an MS in a wireless communication system according to an embodiment of the present disclosure.

FIG. 23 schematically illustrates an example of an MS in a wireless communication system according to an embodiment of the present disclosure.

Referring to FIG. 23, an MS 2300 may be connected with an external electronic device (not illustrated in FIG. 23) using at least one of a communication module, a connector, and an earphone connecting jack. The electronic device may include one of various devices which are removable from the MS 2300 and are connectible with the MS 2300 in a wired manner, such as, for example, an earphone, an external speaker, a universal serial bus (USB) memory, a charging device, a cradle/dock, a digital multimedia broadcasting (DMB) antenna, a mobile payment-related device, a health management device (a blood pressure monitor or the like), a game console, a vehicle navigation device, and so forth.

The external electronic device may be one of a wirelessly connectible Bluetooth communication device, a near field communication (NFC) device, a Wi-Fi direct communication device, a wireless AP, etc. The MS 2300 may be connected with a server or another communication device such as, for example, one of a cellular phone, a smart phone, a tablet PC, a desktop PC, and a server, in a wired or wireless manner.

The MS 2300 includes a camera processor 2311, an image processor 2313, a display 2315, a controller 2317, a radio frequency (RF) processor 2319, a data processor 2321, a memory 2323, an audio processor 2325, and a key input unit 2327.

The RF processor 2319 is responsible for radio communication of the MS 2300. The RF processor 2319 includes an RF transmitter for frequency up-converting transmission signals and amplifying the up-converted signals, and an RF receiver for low-noise-amplifying received signals and frequency down-converting the amplified signals.

The data processor 2321 includes a transmitter for encoding and modulating the transmission signals, and a receiver for demodulating and decoding the received signals. In other words, the data processor 2321 may include a modulator/de-modulator (MODEM) and a coder/decoder (CODEC). The CODEC includes a data CODEC for processing packet data, and an audio CODEC for processing audio signals such as voice.

The audio processor 2325 plays received audio signals output from the audio CODEC in the data processor 2321 using a speaker, and transfers transmission audio signals picked up by a microphone to the audio CODEC in the data processor 2321.

The key input unit 2327 includes numeric/character keys for inputting numeric and character information and function keys for setting various functions.

A memory 2323 may include a program memory, a data memory, and the like. The program memory may store programs for controlling the general operation of the MS 2300. In accordance with an embodiment to the present disclosure, the memory 2323 may store programs related to an operation of performing a paging process in a wireless communication system. The data memory may temporarily store the data generated during execution of these programs.

The memory 2323 may be implemented as an arbitrary data storing device such as a read only memory (ROM), a random access memory (RAM), and a memory card (for example, a secure digital (SD) card, and a memory stick). The memory 2323 may include a non-volatile memory, a volatile memory, a hard disk drive (HDD), or a solid state drive (SSD).

The memory 2323 may also store applications of various functions such as navigation, video communication, games, an alarm application based on time, images for providing a graphic user interface (GUI) related to the applications, user information, documents, databases or data related to a method for processing touch inputs, background images (for example, a menu screen, a standby screen, and so forth), operation programs necessary for driving the MS 2300, and images captured by the camera processor 2311.

The memory 2323 is a media which is red though a machine, e.g., a computer. Here, the term "machine-readable medium" includes a medium for providing data to the machine to allow the machine to execute a particular function. The memory 2323 may include non-volatile media and volatile media. Such a medium needs to be of a tangible type so that commands delivered to the medium can be identified by a physical tool which reads the commands with the machine.

The machine-readable medium may include, but is not limited to, at least one of a floppy disk, a flexible disk, a hard disk, a magnetic tape, a compact disc ROM (CD-ROM), an optical disk, a punch card, a paper tape, a RAM, a programmable ROM (PROM), an erasable PROM (EPROM), and a flash-EPROM.

The controller 2317 controls the overall operation of the MS 2300. The controller 2317 performs an operation related to an operation of performing a paging process in a wireless communication system according to an embodiment of the present disclosure. The operation related to the operation of performing the paging process in the wireless communication system according to an embodiment of the present disclosure is performed in the manner described before with reference to FIGS. 3 to 22, so a detailed description thereof will be omitted herein.

A camera processor 2311 includes a camera sensor for capturing images and converting the captured optical image signal into an electrical signal, and a signal processor for converting the analog image signal captured by the camera sensor into digital data. The camera sensor may be assumed to be a charge-coupled device (CCD) or complementary metal-oxide-semiconductor (CMOS) sensor, and the signal processor may be implemented with a digital signal processor (DSP). The camera sensor and the signal processor may be implemented either in an integrated way, or in a separated way.

The image processor 2313 performs image signal processing (ISP) for displaying the image signals output from the camera processor 2311 on the display 2315. The ISP may include gamma correction, interpolation, spatial variations, image effects, image scaling, automatic white balance (AWB), automatic exposure (AE), and automatic focus (AF). The image processor 2313 processes the image signals output from the camera processor 2311 on a frame-by-frame basis, and outputs the frame image data according to the characteristics and size of the display 2315.

The image processor 2313 includes a video codec, which compresses the frame image data displayed on the display 2315 by a preset coding scheme, and decompresses the compressed frame image data into the original frame image data. The video codec may include a joint photographic experts group (JPEG) codec, an MPEG4 codec, and a Wavelet codec. The image processor 2313 is assumed to have an on-screen display (OSD) function, and may output OSD data according to the size of the displayed screen, under control of the controller 2317.

The display 2315 displays, on its screen, image signals output from the image processor 2313 and user data output from the controller 2317. The display 2315 may include a liquid crystal display (LCD). In this case, the display 2315 may include an LCD controller, a memory capable of storing image data, and an LCD panel. When implemented in a touch screen manner, the LCD may serve as an input unit. In this case, the same keys as those on the key input unit 2327 may be displayed on the display 2315.

If the display 2315 is implemented as the touch screen, the display 2315 outputs an analog signal, which corresponds to at least one input to a user graphic interface, to the controller 2317.

The display 2315 receives at least one user input through a user's body (for example, a finger including a thumb) or the key input unit 2327 (for example, a stylus pen or an electronic pen).

The display 2315 receives continuous motions on one touch (for example, a drag). The display 2315 outputs an analog signal corresponding to the continuous motions to the controller 2317.

In an embodiment of the present disclosure, a touch may also include a non-contact touch (for example, when the user input means is positioned within a distance of, for example, 1 cm) in which the user input means may be identified without a direct contact with the display 2315. The touch may also include a direct contact between the display 2315 and a finger or the key input unit 2327. A distance or interval from the display 2315 within which the user input means may be identified may be changed according to the capability or structure of the MS 2300. In particular, to separately identify a direct touch event based on a contact with the user input means and an indirect touch event (that is, a hovering event), the display 2315 may be configured to output different values for values (for example, an analog voltage value or current value) identified in the direct touch event and the hovering event.

The display 2315 may be implemented as, for example, a resistive type, a capacitive type, an infrared type, an acoustic wave type, or a combination thereof.

The display 2315 may include at least two touch panels capable of sensing a touch, an approach of a finger, or the key input unit 2327 to receive inputs generated by the finger or the key input unit 2327. The at least two touch panels provide different output values to the controller 2317. Thus, the controller 2317 differently recognizes the values input from the at least two touch screen panels to identify whether the input from the display 2315 is the input generated by the finger or by the key input unit 2327.

The controller 2317 converts the analog signal received from the display 2315 into a digital signal and controls the display 2315 using the digital signal. For example, the controller 2317 may control a shortcut icon (not illustrated in FIG. 23) displayed on the display 2315 to be selected or executed in response to a direct touch event or a hovering event.

The controller 2317, by identifying a value (for example, an electric-current value) output through the display 2315, recognizes a hovering interval or distance as well as a user input position and converts the recognized distance into a digital signal (for example, a Z coordinate). The controller 2317 may also, by identifying the value output through the display 2315, identify a pressure applied by the user input means to the display 2315, and convert the identified pressure into a digital signal.

While the camera processor 2311, the image processor 2313, the display 2315, the controller 2317, the RF processor 2319, the data processor 2321, the memory 2323, the audio processor 2325, and the key input unit 2327 are shown in FIG. 23 as separate units, it is to be understood that this is for merely convenience of description. In other words, two or more of the camera processor 2311, the image processor 2313, the display 2315, the controller 2317, the RF processor 2319, the data processor 2321, the memory 2323, the audio processor 2325, and the key input unit 2327 may be incorporated into a single unit.

Alternatively, the MS 2300 may be implemented with one processor.

An example of an MS in a wireless communication system according to an embodiment of the present disclosure has been described with reference to FIG. 23, and another example of an MS in a wireless communication system according to an embodiment of the present disclosure will be described with reference to FIG. 24.

Figure 24:
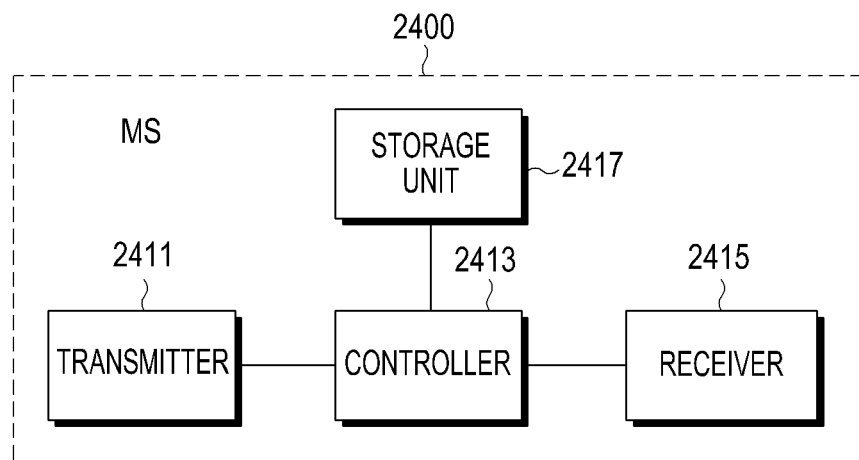
FIG. 24 schematically illustrates another example of an MS in a wireless communication system according to an embodiment of the present disclosure.

FIG. 24 schematically illustrates another example of an MS in a wireless communication system according to an embodiment of the present disclosure.

Referring to FIG. 24, an MS 2400 includes a transmitter 2411, a controller 2413, a receiver 2415, and a storage unit 2417.

The controller 2413 controls the overall operation of the MS 2400. More particularly, the controller 2413 controls the MS 2400 to perform an operation related to an operation of performing a paging process in a wireless communication system according to an embodiment of the present disclosure. The operation related to the operation of performing the paging process in the wireless communication system according to an embodiment of the present disclosure is performed in the manner described with reference to FIGS. 3 to 22, and a description thereof will be omitted herein.

The transmitter 2411 transmits various signals and various messages, and the like to other devices, e.g., a BS, and the like included in the wireless communication system under a control of the controller 2413. The various signals, the various messages, and the like transmitted in the transmitter 2411 have been described in FIGS. 3 to 22 and a description thereof will be omitted herein.

The receiver 2415 receives various signals, various messages, and the like from a BS, and the like included in the wireless communication system under a control of the controller 2413. The various signals, the various messages, and the like received in the receiver 2415 have been described in FIGS. 3 to 22 and a description thereof will be omitted herein.

The storage unit 2417 stores a program related to an operation of performing a paging process in a wireless communication system according to an embodiment of the present disclosure which the MS 2400 performs under a control of the controller 2413, various data, and the like.

The storage unit 2417 stores the various signals and the various messages which the receiver 2415 receives from the BS, and the like.

While the transmitter 2411, the controller 2413, the receiver 2415, and the storage unit 2417 are described in the MS 2400 as separate units, it is to be understood that this is merely for convenience of description. In other words, two or more of the transmitter 2411, the controller 2413, the receiver 2415, and the storage unit 2417 may be incorporated into a single unit.

The MS 2400 may be implemented with one processor.

Another example of an MS in a wireless communication system according to an embodiment of the present disclosure has been described with reference to FIG. 24, and an example of a BS in a wireless communication system according to an embodiment of the present disclosure will be described with reference to FIG. 25.

Figure 25:
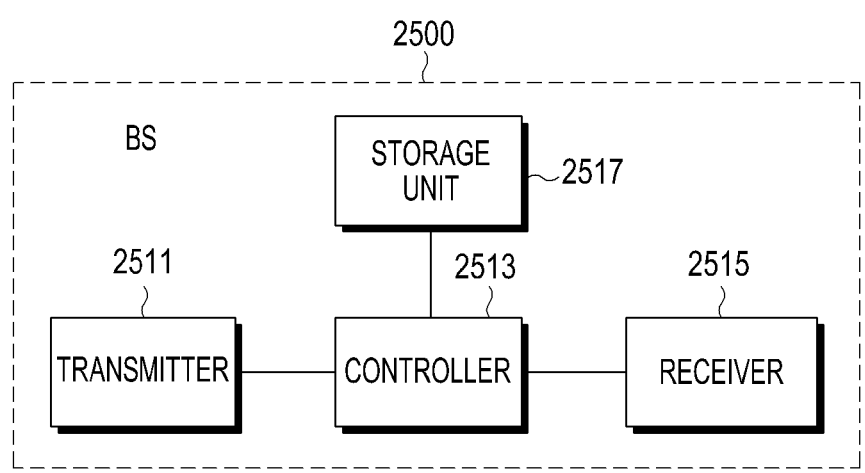
FIG. 25 schematically illustrates an example of a BS in a wireless communication system according to an embodiment of the present disclosure.

FIG. 25 schematically illustrates an example of a BS in a wireless communication system according to an embodiment of the present disclosure.

Referring to FIG. 25, a BS 2500 includes a transmitter 2511, a controller 2513, a receiver 2515, and a storage unit 2517.

The controller 2513 controls the overall operation of the BS 2500. More particularly, the controller 2513 controls the BS 2500 to perform an operation related to an operation of performing a paging process in a wireless communication system according to an embodiment of the present disclosure. The operation related to the operation of performing the paging process in the wireless communication system according to an embodiment of the present disclosure is performed in the manner described with reference to FIGS. 3 to 22, and a description thereof will be omitted herein.

The transmitter 2511 transmits various signals and various messages, and the like to other devices, e.g., an MS, and the like included in the wireless communication system under a control of the controller 2513. The various signals, the various messages, and the like transmitted in the transmitter 2511 have been described in FIGS. 3 to 22 and a description thereof will be omitted herein.

The receiver 2515 receives various signals, various messages, and the like from an MS, and the like included in the wireless communication system under a control of the controller 2513. The various signals, the various messages, and the like received in the receiver 2515 have been described in FIGS. 3 to 22 and a description thereof will be omitted herein.

The storage unit 2517 stores a program related to an operation of performing a paging process in a wireless communication system according to an embodiment of the present disclosure which the BS 2500 performs under a control of the controller 2513, various data, and the like.

The storage unit 2517 stores the various signals and the various messages which the receiver 2515 receives from the MS, and the like.

While the transmitter 2511, the controller 2513, the receiver 2515, and the storage unit 2517 are described in the BS 2500 as separate units, it is to be understood that this is merely for convenience of description. In other words, two or more of the transmitter 2511, the controller 2513, the receiver 2515, and the storage unit 2517 may be incorporated into a single unit.

The BS 2500 may be implemented with one processor.

As is apparent from the foregoing description, an embodiment of the present disclosure enables to perform a paging process in a wireless communication system.

An embodiment of the present disclosure enables to perform a paging process thereby decreasing power consumption of an MS in a wireless communication system.

An embodiment of the present disclosure enables to perform a paging process by considering a coverage class in a wireless communication system.

An embodiment of the present disclosure enables to perform a paging process by considering an idle mode operation in a wireless communication system.

An embodiment of the present disclosure enables to perform a paging process thereby decreasing resource consumption for the paging process in a wireless communication system.

An embodiment of the present disclosure enables to perform a paging process thereby increasing resource efficiency in a wireless communication system.

Certain aspects of the present disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include ROM, RAM, CD-ROMs, magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure may be implemented by hardware, software and/or a combination thereof. The software may be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a CD, a DVD, a magnetic disk, a magnetic tape, and/or the like). A method and apparatus according to an embodiment of the present disclosure may be implemented by a computer or a mobile terminal that includes a controller and a memory, and the memory may be an example of a non-transitory machine-readable (e.g., computer-readable), storage medium suitable to store a program or programs including instructions for implementing various embodiments of the present disclosure.

The present disclosure may include a program including code for implementing the apparatus and method as defined by the appended claims, and a non-transitory machine-readable (e.g., computer-readable), storage medium storing the program. The program may be electronically transferred via any media, such as communication signals, which are transmitted through wired and/or wireless connections, and the present disclosure may include their equivalents.

An apparatus according to an embodiment of the present disclosure may receive the program from a program providing device which is connected to the apparatus via a wire or a wireless and store the program. The program providing device may include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for performing a paging procedure by a base station (BS) in a wireless communication system, the method comprising:
    identifying that paging for a mobile station (MS) is initiated;
    transmitting, to the MS, a paging indicator for scheduling a paging message, the paging indicator including both of a first part indicating a paging radio network temporary identifier (RNTI) and a second part indicating a group of MSs which need to receive the paging message; and
    transmitting, to the MS, the paging message including an identifier of the MS based on the paging indicator,
    wherein the first part is set to a pre-defined value, and
    wherein the paging indicator is transmitted in scheduling information associated with a coverage class of the MS to be paged.

2. The method of claim 1, wherein the first part is commonly applied to all coverage classes which are supported in the wireless communication system.

3. The method of claim 1, wherein the second part is set to a value individually applied to each coverage class which is supported in the wireless communication system.

4. The method of claim 1, further comprising:
receiving information of a last coverage class of the MS and the identifier of the MS.

5. The method of claim 1, wherein the paging message is transmitted on a physical downlink shared channel (PDSCH).

6. A method for performing a paging procedure by a mobile station (MS) in a wireless communication system, the method comprising:
receiving, from a base station (BS), a paging indicator for scheduling a paging message, the paging indicator including both of a first part indicating a paging radio network temporary identifier (RNTI) and a second part indicating a group of MSs which need to receive the paging message; and
receiving the paging message including an identifier of the MS from the BS in response to identifying that the MS is included in the group indicated by the paging indicator,
wherein the first part is set to a pre-defined value, and
wherein the paging indicator is received in scheduling information associated with a coverage class of the MS to be paged.

7. The method of claim 6, wherein the first part is commonly applied to all coverage classes which are supported in the wireless communication system.

8. The method of claim 6, wherein the second part is set to a value individually applied to each coverage class which is supported in the wireless communication system.

9. The method of claim 6, further comprising:
transmitting information of a last coverage class of the MS and the identifier of the MS.

10. The method of claim 6, wherein the paging message is received on a physical downlink shared channel (PDSCH).

11. A mobile station (MS) in a wireless communication system, the MS comprising:
a transceiver; and
a processor coupled with the transceiver and configured to:
receive, from a base station (BS), a paging indicator for scheduling a paging message, the paging indicator including both of a first part indicating a paging radio network temporary identifier (RNTI) and a second part indicating a group of MSs which need to receive the paging message, and
receive the paging message including an identifier of the MS from the BS in response to identifying that the MS is included in the group indicated by the paging indicator,
wherein the first part is set to a pre-defined value, and
wherein the paging indicator is received in scheduling information associated with a coverage class of the MS to be paged.

12. The MS of claim 11, wherein the first part is commonly applied to all coverage classes which are supported in the wireless communication system.

13. The MS of claim 11, wherein the second part is set to a value individually applied to each coverage class which is supported in the wireless communication system.

14. The MS of claim 11, wherein the processor is further configured to transmit information of a last coverage class of the MS and the identifier of the MS.

15. The MS of claim 11, wherein the paging message is received on a physical downlink shared channel (PDSCH).

16. A base station (BS) in a wireless communication system, the BS comprising:
a transceiver; and
a processor coupled with the transceiver and configured to:
identify that paging for a mobile station (MS) is initiated,
transmit, to the MS, a paging indicator for scheduling a paging message, the paging indicator including both of a first part indicating a paging radio network temporary identifier (RNTI) and a second part indicating a group of MSs which need to receive the paging message, and
transmit, to the MS, the paging message including an identifier of the MS based on the paging indicator,
wherein the first part is set to a pre-defined value, and
wherein the paging indicator is received in scheduling information associated with a coverage class of the MS to be paged.

17. The BS of claim 16, wherein the first part is commonly applied to all coverage classes which are supported in the wireless communication system.

18. The BS of claim 16, wherein the second part is set to a value individually applied to each coverage class which is supported in the wireless communication system.

19. The BS of claim 16, wherein the processor is further configured to:
receive information of a last coverage class of the MS and the identifier of the MS.

20. The BS of claim 16, wherein the paging message is transmitted on a physical downlink shared channel (PDSCH).

* * * * *